(12) United States Patent
Honda

(10) Patent No.: US 7,925,305 B2
(45) Date of Patent: Apr. 12, 2011

(54) PORTABLE COMMUNICATION TERMINAL

(75) Inventor: Masanori Honda, Higashihiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 520 days.

(21) Appl. No.: 11/032,573

(22) Filed: Jan. 11, 2005

(65) Prior Publication Data

US 2005/0156879 A1 Jul. 21, 2005

(30) Foreign Application Priority Data

Jan. 19, 2004 (JP) ................... 2004-010992
Jan. 19, 2004 (JP) ................... 2004-011000
Jan. 19, 2004 (JP) ................... 2004-011007

(51) Int. Cl.
*H04B 1/38* (2006.01)
*G06F 3/048* (2006.01)

(52) U.S. Cl. ............ 455/566; 455/550.1; 715/781; 715/788; 715/789; 715/790; 715/794

(58) Field of Classification Search ............... 345/1.1, 345/1.2, 156, 168, 169, 172; 715/790, 781, 715/788, 789, 794; 341/23; 455/566, 550.1
See application file for complete search history.

(56) References Cited

U.S. PATENT DOCUMENTS

| | | | |
|---|---|---|---|
| 5,572,648 A | 11/1996 | Bibayan | |
| 6,304,763 B1 * | 10/2001 | Jahagirdar et al. | 455/566 |
| 6,396,924 B1 | 5/2002 | Suso et al. | |
| 6,546,263 B1 | 4/2003 | Petty et al. | |
| 6,668,177 B2 * | 12/2003 | Salmimaa et al. | 455/566 |
| 6,697,083 B1 * | 2/2004 | Yoon | 345/658 |
| 6,894,661 B1 * | 5/2005 | Tuli | 345/1.1 |
| 7,155,260 B2 | 12/2006 | Tanaka et al. | |
| 7,191,211 B2 * | 3/2007 | Tuli | 709/203 |
| 2002/0137551 A1 * | 9/2002 | Toba | 455/566 |
| 2003/0064757 A1 | 4/2003 | Yamadera et al. | |
| 2003/0083109 A1 | 5/2003 | King et al. | |
| 2003/0119562 A1 * | 6/2003 | Kokubo | 455/566 |
| 2004/0214610 A1 * | 10/2004 | Tanemura et al. | 455/566 |
| 2004/0214640 A1 * | 10/2004 | Giobbi | 463/39 |
| 2005/0070334 A1 * | 3/2005 | Ono et al. | 455/566 |
| 2005/0113145 A1 * | 5/2005 | Chon | 455/566 |

FOREIGN PATENT DOCUMENTS

EP 1 303 114 A2 4/2003

(Continued)

OTHER PUBLICATIONS

Nokia 9210i Communicator, User's Guide.

(Continued)

*Primary Examiner* — My-Chau T Tran
(74) *Attorney, Agent, or Firm* — Birch, Stewart, Kolasch & Birch, LLP

(57) ABSTRACT

There is provided a portable communication terminal capable of switching between icon display and non-display. Processes executed by a control unit of a portable phone which is an aspect of the portable communication terminal comprises the steps of detecting, during the execution of an icon-bar displaying process, a press of an operation key, terminating outputting icon data if the operation key is associated with the icon-bar non-display function and if there is already no icon bar being displayed, detecting a press of the operation key, and executing the icon-bar displaying process if the operation key is associated with the icon-bar display function and if there is no icon bar being displayed.

13 Claims, 25 Drawing Sheets

FOREIGN PATENT DOCUMENTS

| | | |
|---|---|---|
| EP | 1-379-062 A2 | 1/2004 |
| JP | 7-121302 A | 5/1995 |
| JP | 9-251371 A | 9/1997 |
| JP | 11-17789 A | 1/1999 |
| JP | 11-39133 A | 2/1999 |
| JP | 11-327741 A | 11/1999 |
| JP | 2000-078549 | 3/2000 |
| JP | 2000-99236 A | 4/2000 |
| JP | 2000-305695 A | 11/2000 |
| JP | 2000-311042 A | 11/2000 |
| JP | 2001-117691 A | 4/2001 |
| JP | 2002-101181 A | 4/2002 |
| JP | 2002-199081 A | 7/2002 |
| JP | 2002-368842 A | 12/2002 |
| JP | 2003-101629 A | 4/2003 |
| JP | 2003-125042 | 4/2003 |
| JP | 2003-152835 A | 5/2003 |
| JP | 2003-174497 A | 6/2003 |
| JP | 2003-219011 A | 7/2003 |
| JP | 2003-298715 A | 10/2003 |
| WO | WO-98/30004 A1 | 7/1998 |
| WO | WO-03/029946 A1 | 4/2003 |
| WO | WO-2006/117105 A1 | 11/2006 |

OTHER PUBLICATIONS

New Generation Network. Partial English translation of "Portable Phone New Products Showcase". A5503SA (snow white), 2004 Impress Corporation. Japan.

A1303SA Operation Manual, Sanyo Electric Co. Ltd (Sep. 2003).

A1303SA Operation Manual (pp. 10-13, 20-22, 86, 113-115, 117 and 177) Sep. 2003.

\* cited by examiner

| D410 FUNCTION | D420 IDENTIFICATION DATA | D430 DATA ADDRESS | D440 EVENT MODE | D450 SHORT CUT FUNCTION |
|---|---|---|---|---|
| REPLY BY VOICE MAIL SERVICE AND TRANSMISSION OF REPLY MAIL UPON RECEPTION OF INCOMING CALL IN IDLE STATE | FIRST ICON | 0001 | IDLE (STANDBY) MODE | VALID |
| REFUSAL OF RECEIVING INCOMING CALL UPON RECEPTION OF INCOMING CALL IN IDLE STATE | SECOND ICON | 0002 | IDLE (STANDBY) MODE | INVALID |
| REPLY BY FIRST VOICE MAIL SERVICE UPON RECEPTION OF INCOMING CALL IN IDLE STATE | ... | ... | IDLE (STANDBY) MODE | VALID |
| REPLY BY SECOND VOICE MAIL SERVICE UPON RECEPTION OF INCOMING CALL IN IDLE STATE | ... | ... | IDLE (STANDBY) MODE | INVALID |
| RECEPTION OF ONLY SOUND UPON RECEPTION OF INCOMING CALL DURING USING TV PHONE | N-TH ICON | ... | IDLE (STANDBY) MODE | INVALID |
| ... | ... | ... | ... | ... |
| READING OF RECEIVED MAIL IN MAIL EDITING MODE | N-TH ICON | ... | MAIL EDITING MODE | VALID |
| REPLY BY CITING RECEIVED MAIL IN MAIL EDITING MODE | | ... | MAIL EDITING MODE | VALID |
| ... | ... | ... | ... | ... |
| VIDEO RECORDING OF MOVING IMAGES DURING ACTIVATION OF CAMERA | ... | ... | CAMERA MODE | VALID |
| BAR CODE RECOGNITION DURING ACTIVATION OF CAMERA | ... | ... | CAMERA MODE | VALID |
| EXECUTION OF OCR FUNCTION DURING ACTIVATION OF CAMERA | ... | ... | | VALID |
| CHANGING OF SIZE DURING ACTIVATION OF CAMERA | ... | ... | | VALID |
| IMAGE EFFECT DURING ACTIVATION OF CAMERA | ... | ... | | VALID |
| ... | ... | ... | ... | ... |

| ... | ... | |
|---|---|---|
| FIRST DISPLAY POSITION | (100, 100) | —D702 |
| SECOND DISPLAY POSITION | (200, 100) | —D704 |
| THIRD DISPLAY POSITION | (300, 100) | —D706 |
| FOURTH DISPLAY POSITION | (400, 100) | —D708 |
| FIFTH DISPLAY POSITION | (500, 100) | —D710 |
| FIRST DISPLAY POSITION | (500, 500) | —D712 |
| SECOND DISPLAY POSITION | (500, 400) | —D714 |
| THIRD DISPLAY POSITION | (500, 300) | —D716 |
| FOURTH DISPLAY POSITION | (500, 200) | —D718 |
| FIFTH DISPLAY POSITION | (500, 100) | —D720 |
| FIRST DISPLAY POSITION | (100, 500) | —D722 |
| SECOND DISPLAY POSITION | (200, 500) | —D724 |
| THIRD DISPLAY POSITION | (300, 500) | —D726 |
| FOURTH DISPLAY POSITION | (400, 500) | —D728 |
| FIFTH DISPLAY POSITION | (500, 500) | —D730 |
| SIXTH DISPLAY POSITION | (500, 400) | —D732 |
| SEVENTH DISPLAY POSITION | (500, 300) | —D734 |
| EIGHTH DISPLAY POSITION | (500, 200) | —D736 |
| NINTH DISPLAY POSITION | (500, 100) | —D738 |
| TENTH DISPLAY POSITION | (400, 100) | —D740 |
| ELEVENTH DISPLAY POSITION | (300, 100) | —D742 |
| TWELFTH DISPLAY POSITION | (200, 100) | —D744 |
| THIRTEENTH DISPLAY POSITION | (100, 100) | —D746 |
| ... | ... | |

| F910 FUNCTION | F912 NUMBER OF ACTIVATION | F914 DATA OF ACTIVATION (YYMMDDhhmmss) |
|---|---|---|
| REPLY BY VOICE MAIL SERVICE AND TRANSMISSION OF REPLY MAIL UPON RECEPTION OF INCOMING CALL IN IDLE STATE | 111 | 20040113123456 — R902 |
| REFUSAL OF RECEIVING INCOMING CALL UPON RECEPTION OF INCOMING CALL IN IDLE STATE | 222 | 20040229010101 — R904 |
| REPLY BY FIRST VOICE MAIL SERVICE UPON RECEPTION OF INCOMING CALL IN IDLE STATE | 333 | 20040301030303 — R906 |
| REPLY BY SECOND VOICE MAIL SERVICE UPON RECEPTION OF INCOMING CALL IN IDLE STATE | ... | ... |
| RECEPTION OF ONLY SOUND UPON RECEPTION OF INCOMING CALL DURING USING TV PHONE | ... | ... |
| ... | ... | ... |
| READING OF RECEIVED MAIL IN MAIL EDITING MODE | ... | ... |
| REPLY BY CITING RECEIVED MAIL IN MAIL EDITING MODE | ... | ... |
| ... | ... | ... |
| VIDEO RECORDING OF MOVING IMAGES DURING ACTIVATION OF CAMERA | ... | ... |
| BAR CODE RECOGNITION DURING ACTIVATION OF CAMERA | ... | ... |
| EXECUTION OF OCR FUNCTION DURING ACTIVATION OF CAMERA | ... | ... |
| CHANGING OF SIZE DURING ACTIVATION OF CAMERA | ... | ... |
| IMAGE EFFECT DURING ACTIVATION OF CAMERA | ... | ... |
| ... | ... | ... |

| FUNCTION | |
|---|---|
| (FIRST PRIORITY) FIRST ICON | —D1002 |
| (SECOND PRIORITY) SECOND ICON | —D1004 |
| (THIRD PRIORITY) THIRD ICON | —D1006 |
| (FOURTH PRIORITY) FOURTH ICON | —D1008 |
| (FIFTH PRIORITY) FIFTH ICON | —D1010 |
| (SIXTH PRIORITY) SIXTH ICON | —D1012 |
| (SEVENTH PRIORITY) SEVENTH ICON | —D1014 |
| (EIGHTH PRIORITY) EIGHTH ICON | —D1016 |
| (NINTH PRIORITY) NINTH ICON | —D1018 |
| (TENTH PRIORITY) TENTH ICON | —D1020 |

| FUNCTION | |
|---|---|
| (FIRST PRIORITY) N-TH ICON | —D1002 |
| (SECOND PRIORITY) FIRST ICON | —D1004 |
| (THIRD PRIORITY) SECOND ICON | —D1006 |
| (FOURTH PRIORITY) THIRD ICON | —D1008 |
| (FIFTH PRIORITY) FOURTH ICON | —D1010 |
| (SIXTH PRIORITY) FIFTH ICON | —D1012 |
| (SEVENTH PRIORITY) SIXTH ICON | —D1014 |
| (EIGHTH PRIORITY) SEVENTH ICON | —D1016 |
| (NINTH PRIORITY) EIGHTH ICON | —D1018 |
| (TENTH PRIORITY) NINTH ICON | —D1020 |

PORTABLE COMMUNICATION TERMINAL

This nonprovisional application is based on Japanese Patent Application Nos. 2004-010992, 2004-011000 and 2004-011007 filed with the Japan Patent Office on Jan. 19, 2004, the entire contents of which are hereby incorporated by reference.

BACKGROUND OF THE INVENTION

1. Field of the Invention

The present invention relates to a portable communication terminal and more particularly to display of images in a portable communication terminal including more than one display. The present invention further relates to a portable communication terminal capable of displaying images according to image planes. The present invention further relates to a portable communication terminal capable of switching between display and non-display of images.

2. Description of the Related Art

Portable phones, a PDA (Personal Digital Assistant) and other portable communication terminals include a display device which is smaller than the display devices of conventional desk-top PCs (Personal Computers). As a result, there is a problem that portable communication terminals can display a limited number of characters, images and other information at the same time, and therefore its user can not easily recognize the information.

Thus, in order to overcome the aforementioned problem, for example, Japanese Patent Laying-Open No. 11-327741 discloses an electronic device capable of efficiently displaying graphics in a limited image displaying area. This electronic device includes a display unit for displaying a plurality of graphics and a moving unit for moving the aforementioned graphics. The moving unit includes a rotating unit for rotating graphics to be visualized.

With the electronic device disclosed in Japanese Patent Laying-Open No. 11-327741, a plurality of graphics are displayed such that they form a single annular shape, and therefore its user can easily recognize the respective graphics.

However, with the electronic device disclosed in Japanese Patent Laying-Open No. 11-327741, as the number of graphics required to be displayed increases, the arc of the generated annular shape approaches a straight line. Therefore, when the number of icons and other graphics is large, the shape is displayed in a straight line, and therefore its user can not easily recognize them.

Further, since portable phones and other portable communication terminals have a limited image displaying area, there is a need to effectively utilize the area for primary image display.

In another aspect, the display devices of portable phones, PDAs and other portable communication terminals have an image displaying area smaller than that of the display devices of PCs and other information processing devices. These portable communication terminals have a document generation function, a communication function and a photographing function and other functions. Each of these functions includes a plurality of processing functions. Therefore, for example, when its user intends to execute a predetermined process function, it is necessary to display a menu image plane which is a list of processes, repeat selection of a particular item, and finally designate the processing function. For example, when a plurality of processes are divided into groups to constitute a deep hierarchy, the user is required to switch the menu display multiple times to reach the required processing function. Namely, there is a problem that the user can not easily switch and perform functions.

Therefore, in order to overcome the aforementioned problem, for example, Japanese Patent Laying-Open No. 2002-199081 discloses a movable communication apparatus capable of shortening operations for selecting a targeted function and completing a configuration. This movable communication apparatus includes a display unit for displaying a plurality of display objects for setting respective functions by dividing the display objects into a plurality of hierarchy display image planes and a function of changing an originally-operated hierarchy display image plane to an operation image plane including a required display object without passing other hierarchy display image planes.

The movable communication apparatus disclosed in Japanese Patent Laying-Open No. 2002-199081 includes a so-called short cut function for completing the operation of a required display object or switching to processes (an image plane) just before the completion from an originally-operated menu hierarchy display image plane without passing other menu hierarchy image planes. Therefore, for the display objects of functions which are often utilized by the user, it is not required to search through multiple hierarchy menus or switch between various modes, the operation procedure can be simplified.

However, with the movable communication apparatus disclosed in Japanese Patent Laying-Open No. 2002-199081, although the operation for moving menus is simplified, standby images, an image being photographed and other images are not displayed when an operation image plane is displayed. Thus, in this aspect, there is a problem that the user can not enjoy other images when menus are switched.

SUMMARY OF THE INVENTION

The present invention was achieved in order to overcome the aforementioned problems. It is an object of the present invention to provide a portable communication terminal which enables its user to easily recognize icons.

It is another object of the present invention to provide a portable communication terminal which enables its user to effectively utilize the image displaying area.

It is still another object of the present invention to provide a portable communication terminal capable of displaying other images even when switching the display of the lists of functions.

It is yet another object of the present invention to provide a portable communication terminal which enables switching the display of the lists of functions through few operation keys.

It is yet another object of the present invention to provide a portable communication terminal which enables switching the display of images depending the state of the utilization by its user.

It is yet another object of the present invention to provide a portable communication terminal capable of efficiently displaying images in the image displaying area.

It is yet another object of the present invention to provide a portable communication terminal capable of displaying, depending on the utilization record of the functions used by its user, images associated with the functions.

It is yet another object of the present invention to provide a portable communication terminal which enables setting the display of images associated with functions.

In order to resolve the above problems, a portable communication terminal according to an aspect of the present invention includes a storing unit for storing image plane data for displaying image planes and a plurality of image data associated with a plurality of functions of the portable communication terminal, a first display unit for displaying images based on data stored in the storing unit, a second display unit for displaying images based on data stored in the storing unit, a determining unit for determining whether or not images based on the image data are to be displayed, and a generating unit for generating display data for displaying the images based on the result of the determining unit. The generating unit includes a first generating unit for generating the display data according to the image display area of the first display unit when the determining unit determines that images based on the image data are to be displayed on the first display unit; and a second generating unit for generating the display data according to the image display area of the second display unit when the determining unit determines that images based on the image data are to be displayed on the second display unit. The portable communication terminal further includes an input unit for receiving an input of selection instructions for the images and a processing unit for executing the function associated with the image data of selected the image.

Preferably, the portable communication terminal further includes a first cabinet and a second cabinet which is foldable with respect to the first cabinet. The input unit includes a first input unit for receiving an input of the selection instructions for images displayed on the first display unit; and a second input unit for receiving an input of the selection instructions for images displayed on the second display unit. The second display unit is placed on the outer side of the portable communication terminal when the first cabinet and the second cabinet are folded. The first display unit is placed on a different surface from the surface on which the second display unit is placed.

Preferably, the portable communication terminal further includes an information input unit for receiving an input of information from the outside. The determining unit includes a display determining unit for determining whether or not the images based on the image data are to be displayed, based on the information from the outside.

Preferably, the information input unit includes a receiving unit for receiving information through a communication line. The portable communication terminal further includes an identifying unit for identifying, based on the received information, functions associated with the information. The storing unit further stores setting information designating whether or not the images based on the image data associated with the functions are to be displayed. The display determining unit determines whether or not the images based on the image data are to be displayed, based on the setting information associated with the identified functions.

Preferably, the information input unit includes an operating unit for enabling the user to input instructions. The display determining unit determines, based on the instructions, whether or not the images based on the image data are to be displayed.

Preferably, the information input unit includes an operation unit for receiving an input of instructions. The storing unit stores a plurality of position data for the images in the image display area. The display determining unit determines, based on the instructions, whether or not images are to be displayed at positions associated with any of the plurality of position data. The generating unit generates the display data according to position data of positions different from the positions associated with any of the position data, when it is determined that the images are not to be displayed at the positions associated with any of the position data.

With the portable communication terminal according to the present invention, images associated with functions are displayed and therefore the user can easily recognize the image icons.

With the portable communication terminal according to the present invention, images associated with functions are displayed or non-displayed, depending on instructions provided by the user or information input from the outside. Therefore, the user can efficiently utilize the functions associated with the respective images by displaying the images when performing a complicated process. When the user is proficient in operation, the images can be displayed to utilize the image display area for a primary operation. Thus, the user can efficiently utilize the image display area of the display device depending on the functions to be utilized.

A portable communication terminal according to another aspect of the invention includes a storing unit for storing image plane data for displaying image planes in association with a plurality of image data associated with a plurality of functions of the portable communication terminal, a display unit for displaying images based on the image plane data and the image data, a data generating unit for generating data for displaying images on the display unit, based on data stored in the storing unit; and a detecting unit for detecting switching instructions for image planes displayed on the display unit. The data generating unit generates data for displaying the image planes based on the image plane data and generates display data for displaying images associated with the respective functions based on the image data, in response to the switching instruction being detected.

Preferably, the portable communication terminal includes a processing unit for realizing the respective functions. The detecting unit detects the switching instruction, in response to functions having been realized by the processing unit.

Preferably, the portable communication terminal further includes an inputting unit for receiving an input of information from the outside. The detecting unit detects the switching instruction in response to the input of the information.

Preferably, the portable communication terminal further includes an inputting unit for receiving an input of information from the outside, a time-measuring unit for measuring the time until the information is input from the outside, and a detecting unit for detecting the information being input. The detecting unit detects the switching instruction when the information from outside is not input for a predetermined time.

Preferably, the storing unit stores setting information input by the user in association with the image data. The generating unit includes a display data generating unit for generating the display data based on the image data and the setting information.

Preferably, the setting information includes priority data for designating the positions at which the images are to be displayed. The storing unit stores the priority data in association with the image data. The display data generating unit generates the display data in association with the positions based on the priority data.

Preferably, the portable communication terminal further includes an operating unit for receiving an input of instructions, a detecting unit for detecting the functions being selected based on the input of instructions, a notification unit for giving notice that the functions are selected, and a control unit for controlling the operation of the notification unit based on data stored in the storing unit.

Preferably, the notification unit includes a light emitting unit for emitting light of at least a single color, the storing unit further stores identification data for identifying the color of light in association with the functions, and the control unit controls the light emitting unit such that light of a color according to the identification data is emitted in response to the functions being selected.

Preferably, the storing unit further stores at least one sound data in association with the functions, the notification unit includes a sound output unit for outputting sound based on the sound data, and the control unit controls the sound output unit such that sound based on the sound data is output in response to the functions being selected.

Preferably, the notification unit includes an oscillating unit for producing oscillation. The storing unit further stores conditions in which the oscillating unit operates in association with the functions. The control unit controls the oscillating unit such that it produces oscillation according to the conditions, in response to the functions being selected.

Preferably, the portable communication terminal further includes an operation unit for receiving an input of instructions; and a photographing unit for photographing an object and outputting image signals. The plurality of functions include operations from photographing objects by the photographing unit to processing the output image signals. The storing unit further stores process procedure for performing the plurality of functions input through the operation unit. The generating unit generates data for displaying images designating the plurality of functions based on the process procedure and outputting it.

Preferably, the display unit includes a first display unit for displaying the image planes and the images based on the image data; and a second display unit for displaying the image planes and the images based on the image data. The storing unit further stores first display area data relating to the display area of the first display unit and second display area data relating to the display area of the second display unit. The generating unit generates the display data based on the first display area data and the image data and generates the display data based on the second display area data and the image data.

Preferably, the portable communication terminal further includes a first cabinet and a second cabinet which is foldable with respect to the first cabinet. The operation unit is placed on the outer side of one of the first cabinet and the second cabinet.

With the portable communication terminal according to the present invention, when a standby state is detected, images associated with predetermined functions are displayed and therefore the user can easily perform other functions:

With the portable communication terminal according to the present invention, data for displaying images associated with functions is generated separately from data for displaying other images to be displayed on the image display area of the display unit of the portable communication terminal. Therefore, in addition to the list of functions, a standby image plane which is predetermined by the user and an image of an object being photographed are displayed. Therefore, the user can enjoy the images when referring to the list of functions. Particularly, when the user is communicating with other communication partners, interruption of the communication can be prevented.

With the portable communication terminal according to the present invention, the user can change the display of the list of functions using few operation keys, thereby improving the usability of the portable communication terminal.

With the portable communication terminal according to the present invention, the user can freely set images to be displayed, and therefore the display of images can be changed depending on the state of utilization by the user.

A portable communication terminal according to still another aspect of the invention includes a display unit having an image display area, a storing unit for storing image plane data for displaying image planes to be displayed in the image display area, a plurality of image data associated with a plurality of functions of the portable communication terminal, a plurality of display positions at which images based on the image data are to be displayed along a predetermined direction in the image display area, the priorities of respective the display positions, and the priorities of respective the functions, a detecting unit for detecting switching instructions for switching the display of the image planes, a generating unit for generating, in response to the switching instruction being detected, display data for displaying respective the images by associating the image data with the priorities of respective the display positions based on the priorities of respective the functions; and an input unit for receiving an input of instructions from a user. The input unit receives an input of instructions for selecting images as selection candidates out of the images displayed on the image display area in the predetermined direction. The input unit can be held in one hand of the user. The portable communication terminal further includes a changing unit for changing the images as selection candidates in the predetermined direction based on the input from the input unit, and a processing unit for executing functions associated with the images based on the inputs from the input unit.

Preferably, the storing unit includes criterion position data associated with predetermined positions in the image display area corresponding to respective the display positions. The portable communication terminal further includes a searching unit for searching image data associated with the criterion position data based on the respective priorities. The generating unit generates the display data by associating the searched image data with the criterion position data.

Preferably, the predetermined positions are display positions placed at the center in the row direction of the image display area. The criterion position data is data associated with the display area. The input unit receives an input of instructions for the selection in the row direction.

Preferably, the predetermined positions are display areas placed at the center in the column direction of the image display area. The criterion position data is data associated with the display area. The input unit receives an input of instructions for the selection in the column direction.

Preferably, the portable communication terminal further includes an acquiring unit for acquiring the priorities based on the history of the execution of functions by the processing unit. The storing unit stores the acquired priorities.

Preferably, the priorities are the frequencies of execution of the functions by the processing unit. The storing unit stores the frequencies in association with image data associated with the functions. The generating unit generates the display data based on the image data and the frequencies.

Preferably, the priorities are the times when the processing unit executed the functions. The storing unit stores the times in association with image data associated with the functions. The generating unit generates the display data based on the image data and the times.

Preferably, the display unit includes a first display unit for displaying the image planes and the images based on the generated display data and the image plane data, a second display unit for displaying the image planes and the images based on the generated display data and the image plane data. The storing unit further stores first information relating to the size of the image display area of the first display unit, the number of first images which can be displayed on the first display unit, second information relating to the size of the image display area of the second display unit, and the number of second images which can be displayed on the second display unit. The generating unit generates the display data by associating the image data with the priorities based on the first information and the number of first images, and generates the display data by associating the image data with the priorities based on the second information and the number of second images.

With the portable communication terminal according to the present invention, images associated with functions are displayed depending on the priorities in the image display area, and therefore the user can quickly select and perform target functions.

With the portable communication terminal according to the present invention, images associated with functions are displayed depending on the record of utilization of functions by the user, and therefore the user can easily select functions which are often utilized. This improves the usability of the portable communication terminal.

With the portable communication terminal according to the present invention, images associated with functions can be displayed depending on the state of utilization by the user.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 4 to 7 are views illustrating a data structure in the portable phone according to an embodiment of the present invention;

FIGS. 9 to 10B are views conceptually illustrating a data structure in the portable phone according to an embodiment of the present invention;

DESCRIPTION OF THE PREFERRED EMBODIMENTS

Figure 1:
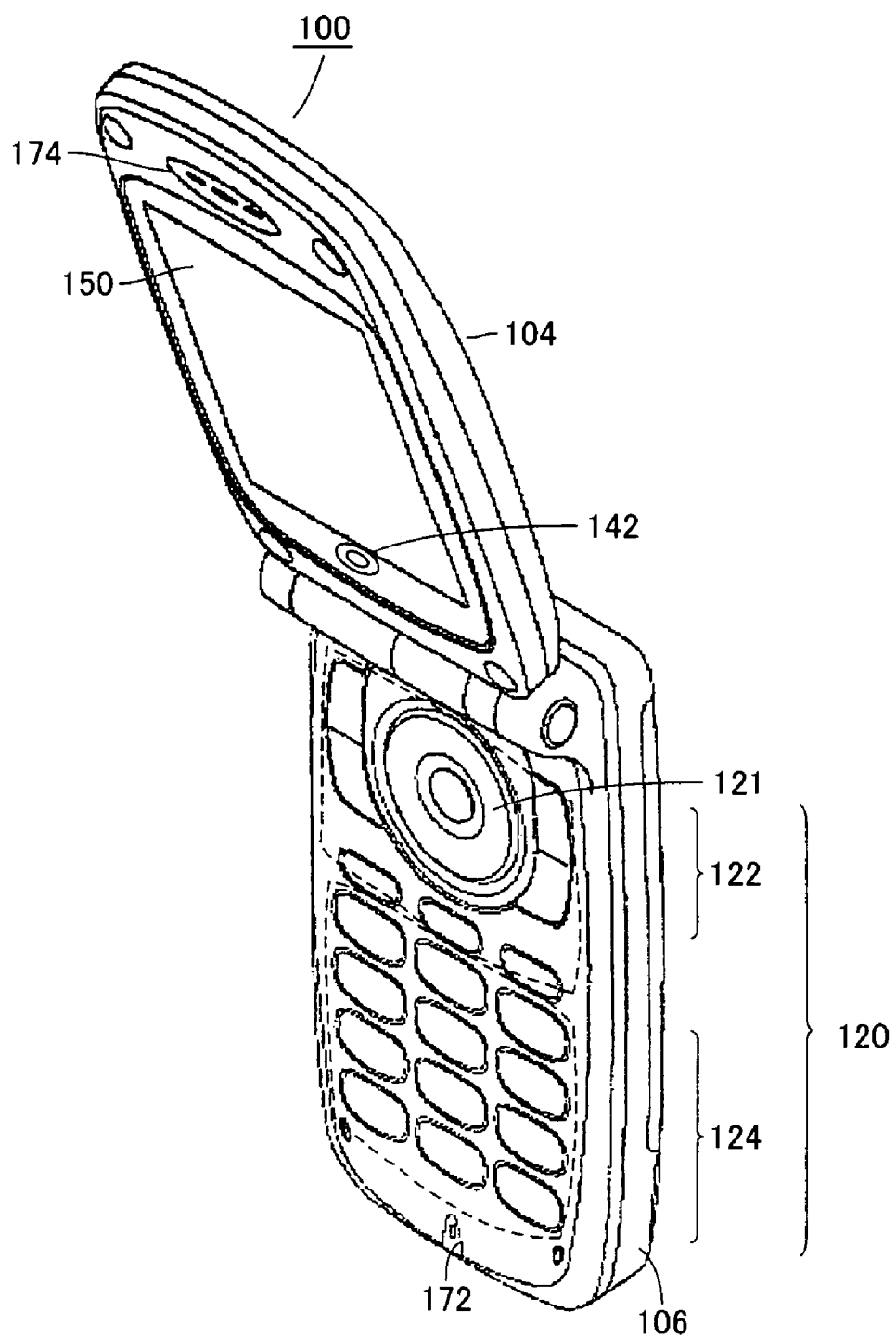
FIGS. 1 to 3 are views illustrating a structure of the portable phone according to an embodiment of the present invention.

Hereinafter, an embodiment of the present invention will be described with reference to the drawings. In the following description, identical components are designated by identical reference characters and also have identical names and functions. Therefore, detail description thereof will not be repeated.

Figure 2:
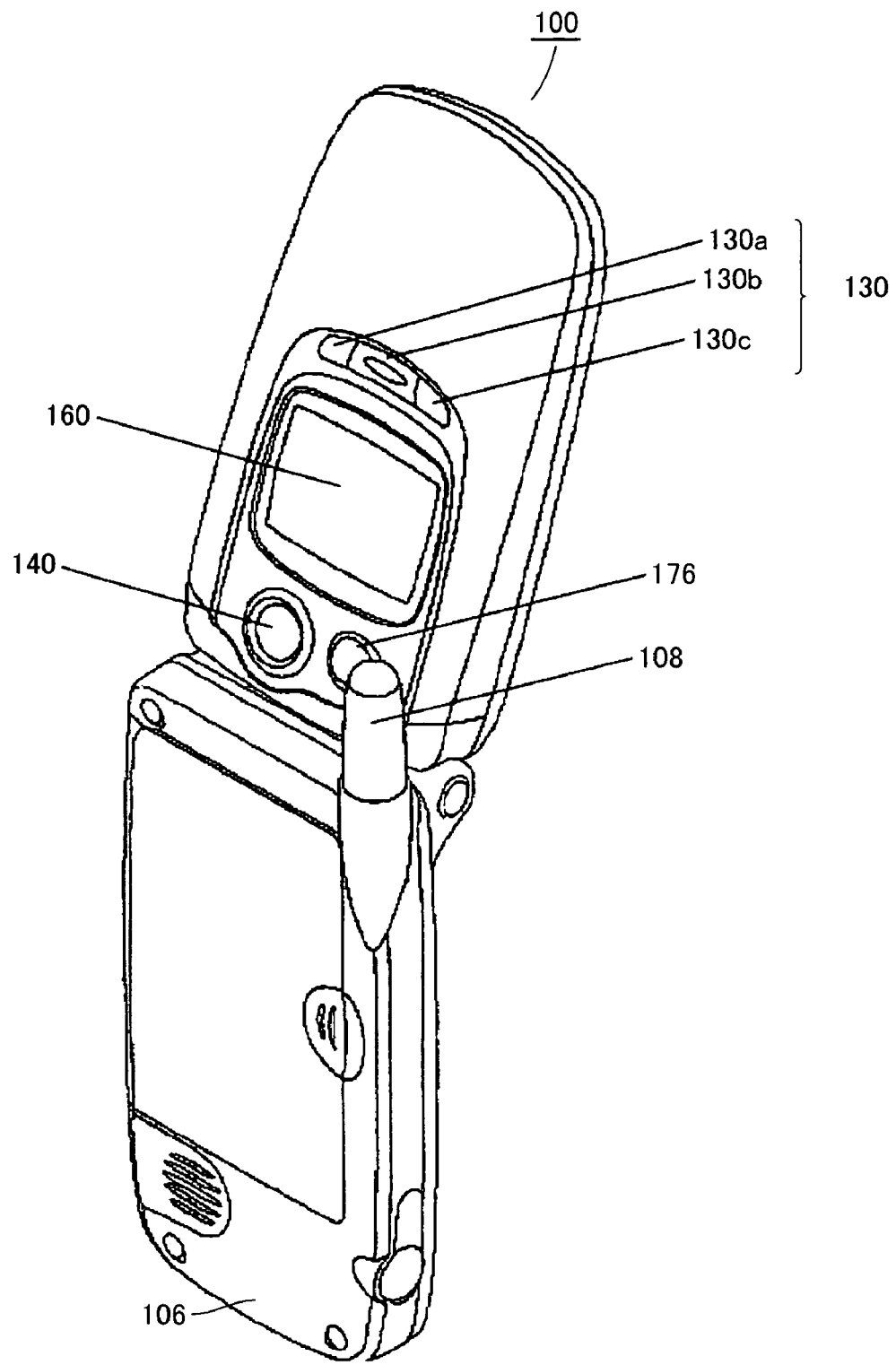

With reference to FIG. 1 and FIG. 2, there will be described a portable phone 100, which is an aspect of a portable communication terminal of the present invention. FIG. 1 is a view illustrating a foldable-type portable phone 100 from the front side thereof, wherein the cabinet is opened. FIG. 2 is a view illustrating portable phone 100 from the back side thereof, wherein the cabinet is opened.

As illustrated in FIG. 1, portable phone 100 includes a first cabinet 104, a second cabinet 106, a speaker 174, a main display 150, a sub-camera 142, a main operation unit 120 and a microphone 172. Main operation unit 120 includes a cursor moving key 122 and 12-keys 124.

As illustrated in FIG. 2, portable phone 100 includes a sub-display 160, a sub-operation unit 130, a main camera 140 and an LED (Light Emitting Diode) 176 on first cabinet 104. Further, portable phone 100 includes an antenna 108 on second cabinet 106. Sub-operation unit 130 includes keys 130a, 130c for moving a cursor displayed on sub-display 160 and a determination key 130b.

Figure 3:
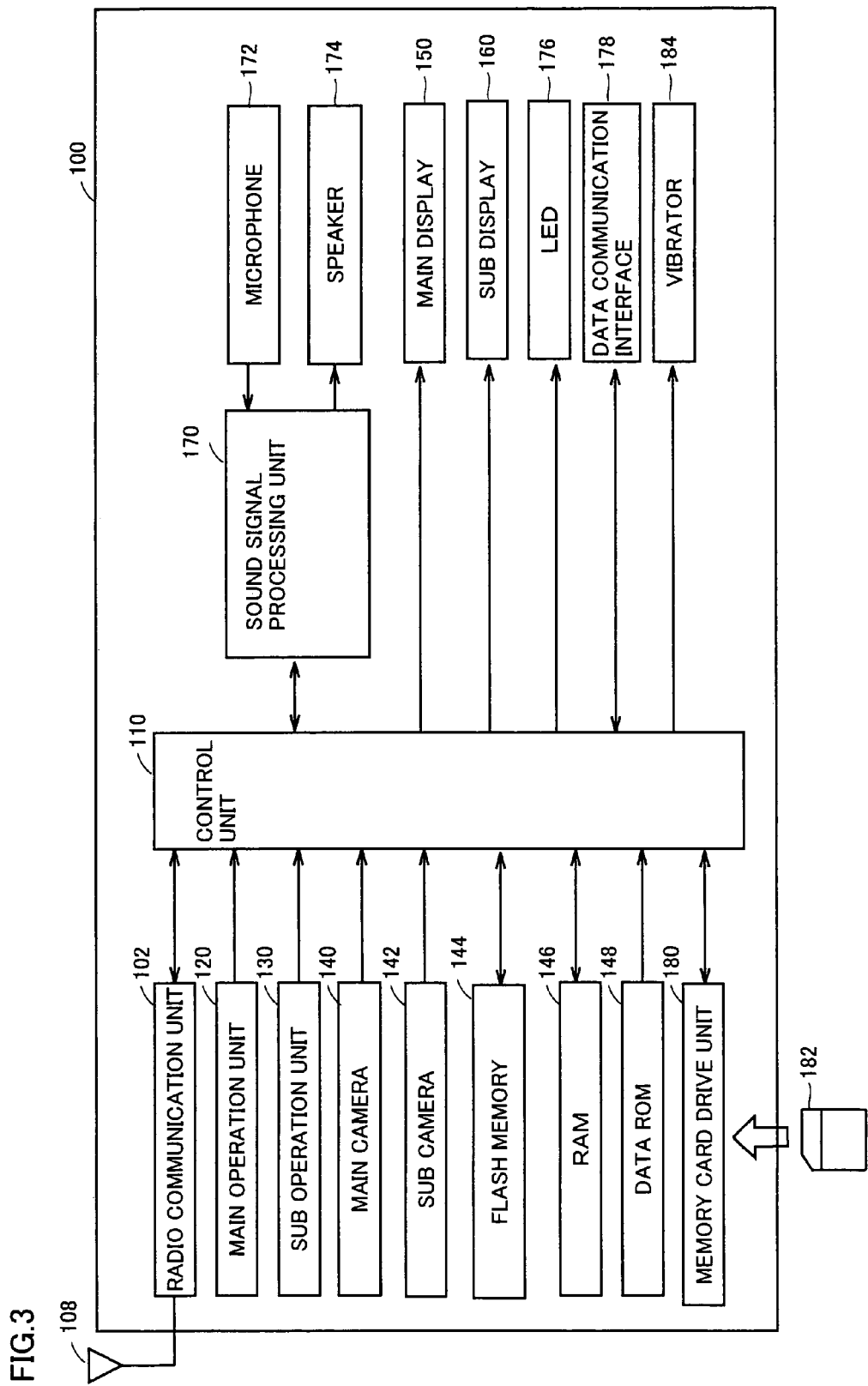

With reference to FIG. 3, a structure of portable phone 100 according to the present embodiment will be described. FIG. 3 is a block diagram illustrating a structure of portable phone 100.

As illustrated in FIG. 3, portable phone 100 includes, in addition to the configurations illustrated in FIG. 1 and FIG. 2, a radio communication unit 102, a control unit 110, a flash memory 144, a RAM (Random Access Memory) 146, a data ROM (Read Only Memory) 148, a sound signal processing unit 170, a data communication IF (Interface) 178 and a memory card drive unit 180. A memory card 182 is mounted to memory card drive unit 180.

When antenna 108 receives a signal, the signal is input to radio communication unit 102. Radio communication unit 102 performs predetermined processes to the input signal and outputs a processed signal. The signal output from radio communication unit 102 is input to control unit 110. On the other hand, a signal to be transmitted is output from control unit 110 and input to radio communication unit 102. Radio communication unit 102 performs a predetermined transmission process for the signal and then outputs the signal. The output signal is transmitted through antenna 108 in a wireless manner.

As previously described, main operation unit 120 includes, for example, a cursor-moving key, 12-keys 124 and other buttons. When a user inputs an instruction through main operation unit 120, a signal corresponding to the instruction is output from main operation unit 120 and then input to control unit 110. Control unit 110 performs predetermined processes to the input signal. Instructions provided by the user include, for example, an instruction for moving the cursor, an instruction for confirming the selection of an item by the cursor and executing it and other instructions.

Further, main operation unit 120 receives an instruction for emphatically displaying particular images (images to be selection candidates) out of a plurality of images displayed on main display 150. Also, main operation unit 120 receives an instruction for confirming a selection from selected images. Thus, an image selected by the user is identified.

As previously described, sub operation unit 130 includes, for example, a key for moving the cursor, similarly to main operation unit 120, or a key for selecting and executing menus instructed by the user. When the user inputs an instruction through sub operation unit 130, sub operation unit 130 outputs a signal corresponding to the instruction and the signal is input to control unit 110. Control unit 110 executes predetermined processes based on the signal. In the case where both main operation unit 120 and sub operation unit 130 are operated when portable phone 100 is opened, an instruction for a predetermined operation unit (for example, main operation unit 120) of these operation units may be preferentially executed. This can prevent false operations of portable phone 100 even if exclusive instructions are input.

Main camera 140 is, for example, a solid-state image-pickup device CCD (Charge Coupled Device). Main camera 140 photographs an object and then generates and outputs a picture signal of the object. The output signal is input to control unit 110. Control unit 110 performs predetermined processes to the signal and outputs the processed signal to main display 150 or sub display 160. The processes include, for example, a process for generating data for displaying an image according to the size of the image display area of main display 150 or sub display 160.

Sub camera 142 is, for example, a solid-state image-pickup device CCD. When the user photographs an object using sub camera 142, sub camera 142 outputs a picture signal and the signal is input to control unit 110. Control unit 110 performs predetermined processes to the input signal and outputs processed signal to main display 150 and sub display 160. The processes include, for example, a process for generating data for displaying an image according to the size of the image display area display of main display 150 or sub display 160.

When the user utters through microphone 172, microphone 172 outputs a sound signal corresponding to the utterance. The output signal is input to sound signal processing unit 170. Sound signal processing unit 170 performs a predetermined signal processing to the signal and output the processed signal to control unit 110. This processing includes, for example, adjustment of the output level of the sound signal. Control unit 110 outputs the signal to radio communication unit 102 and the signal is transmitted through antenna 108, or control unit 110 outputs the signal to data communication IF 178.

A sound signal received by portable phone 100 through antenna 108 is input to sound signal processing unit 170 through radio communication unit 102 and control unit 110. Sound signal processing unit 170 converts the signal based on predetermined processes and outputs the converted signal to speaker 174.

Flash memory 144 stores data for executing respective processes. The data structure in flash memory 144 and the respective processes will be described later.

RAM 146 temporarily stores data to be processed by control unit 110. Control unit 110 reads data stored in RAM 146 and executes a predetermined process. This processing includes generating display data for displaying images.

Data ROM 148 stores application programs (for example, a mail editing program, an image processing program, a sound playback program and other programs) included in portable phone 100. These programs are read by control unit 110. After predetermined processes are executed by these programs, data associated with the respective processes are written into RAM 146. Main display 150 or sub display 160 displays images based on the data.

Main display 150 is, for example, a liquid crystal display and may be any other display device. Main display 150 displays images based on data read by control unit 110.

Similarly, sub display 160 is, for example, a liquid crystal display and may be any other display device. Sub display 150 displays images based on data read by control unit 110. Here, main display 150 and sub display 160 display either identical images or different images. For example, one of these displays may display an image of an object photographed by main camera 140 or sub camera 142 and the other display may display data (for example, contents of received mails) stored in flash memory 144 or other storage means.

LED 176 is an aspect of a light emitting means, and emits light based on predetermined light colors, on detecting calls or mails being received by portable phone 100. In this case, LED 176 is not required to include a particular color and may include a plurality of colors. Also, the light emitting means is not limited to LED 176 and may be any other aspects.

Data communication IF 178 is an interface for data communication through, for example, a communication cable (not shown). The aspect of this interface is not particularly limited.

A vibrator 184 is an oscillating means for giving a notice of a call or mail being received or other states. When it is detected that a call or mail is received, control unit 110 causes vibrator 184 to oscillate based on a predetermined oscillation frequency. The aspect of this oscillation may be changed depending on the person who sent the call or mail. The oscillating means is not limited to vibrator 184.

Memory card drive unit 180 is a means for driving a detachable memory card 182 from which and to which data is readable and writable. Namely, when memory card 182 is mounted to memory card drive unit 180, data stored in memory card 182 is read out and is temporarily written into RAM 146. By providing storage media detachable to portable phone 100 as described above, data set by the user or other data stored in respective storage means of portable phone 100 can be transferred to other portable communication terminals.

As previously described, the functions of portable phone 100 according to the present embodiment are realized by the hardware or software executed by control unit 110. This software may be prestored in storage means such as flash memory 144, RAM 146, data ROM 148, etc. Also, the software may be stored in memory card 182 or other detachable information memory media and then distributed. Further, the software may be read from the information memory media by memory card drive unit 180 and then temporarily stored in flash memory 144. The software is read out from flash memory 144 into RAM 146 and then executed by control unit 110. The hardware structure of portable phone 100 illustrated in FIG. 3 corresponds to that of a computer within the range of the aforementioned structure and the operation thereof and is a common structure within this range. Therefore, it can be said that the most essential part of the present invention is a software, namely a program product, stored in flash memory 144, RAM 146, data ROM 148, memory card 182 or other storage means. The operation of the hardware of this computer is well-known and therefore description thereof will not be repeated.

Also, it is not necessary that portable phone 100 has a foldable structure. Further, it is not necessary that portable phone 100 includes more than one display device and it is necessary that portable phone 100 includes at least one display device. Further, it is not necessary that portable phone 100 includes memory card drive device 180. Also, a structure of the storage means is not limited to the one illustrated in FIG. 3 and it is necessary that portable phone 100 includes only at least one storage means.

With reference to FIG. 4, a data structure of portable phone 100 according to the present embodiment will be described. FIG. 4 is a view conceptually illustrating an aspect of data storage in flash memory 144.

As illustrated in FIG. 4, data designating functions are stored in data area D410. Here, the functions refer to individual processes executed for realizing application programs in portable phone 100. The processes include, for example, reply by voice mail service or transmission of reply mail when a call is received in an idle state, a process for refusing incoming-call reception, a process for reading received mails in a mail editing mode and other processes. It is unnecessary that a function is constituted by a single process. Namely, a plurality of processes may constitute one single function.

Identification data (for example, ID (identification) number) for identifying icons (images) associated with the functions are stored in data area D420. The identification data may be, for example, a file name of an image data of an icon or a number assigned based on a predetermined criterion.

Addresses at which the data is stored are stored in data area D430. Namely, an address designates a location at which substances of the identification data illustrated in data area D420 are stored. These addresses may be either addresses in the same memory means or addresses in other memory means.

Data designating event modes is stored in data area D440. Here, the event mode refers to a state where respective image planes are displayed in the applications included in portable phone 100. For example, when a power supply is in an ON state, the event mode is an idle mode, namely a standby mode. Further, when the user performs a predetermined process to display a mail editing image plane, the event mode is a mail editing mode. Also, when the camera is activated to enable photographing, main display 150 or sub display 160 displays an object photographed by main camera 140 or sub camera 142. In this case, the event mode is a camera mode. Variations of the event mode are not limited to the examples shown in FIG. 4 and other modes may be set depending on the functions of portable phone 100.

Data designating whether or not a short cut function is valid is stored in data area D450. This data is the one which, when any of icons is selected, sets whether or not the function associated with the icon can be actually activated. When the user sets the short cut function to be valid in the configuration image plane, the function associated with the icon can be performed. On the other hand, when the user set the short cut function to be invalid, the function associated with the icon can not be performed even if the icon is selected and pushed by a button. This enables temporally making the functions associated with the displayed icons valid or invalid. Further, the data structure in flash memory 144 is not limited to the aspect illustrated in FIG. 4 and may be other aspects.

Figure 5:
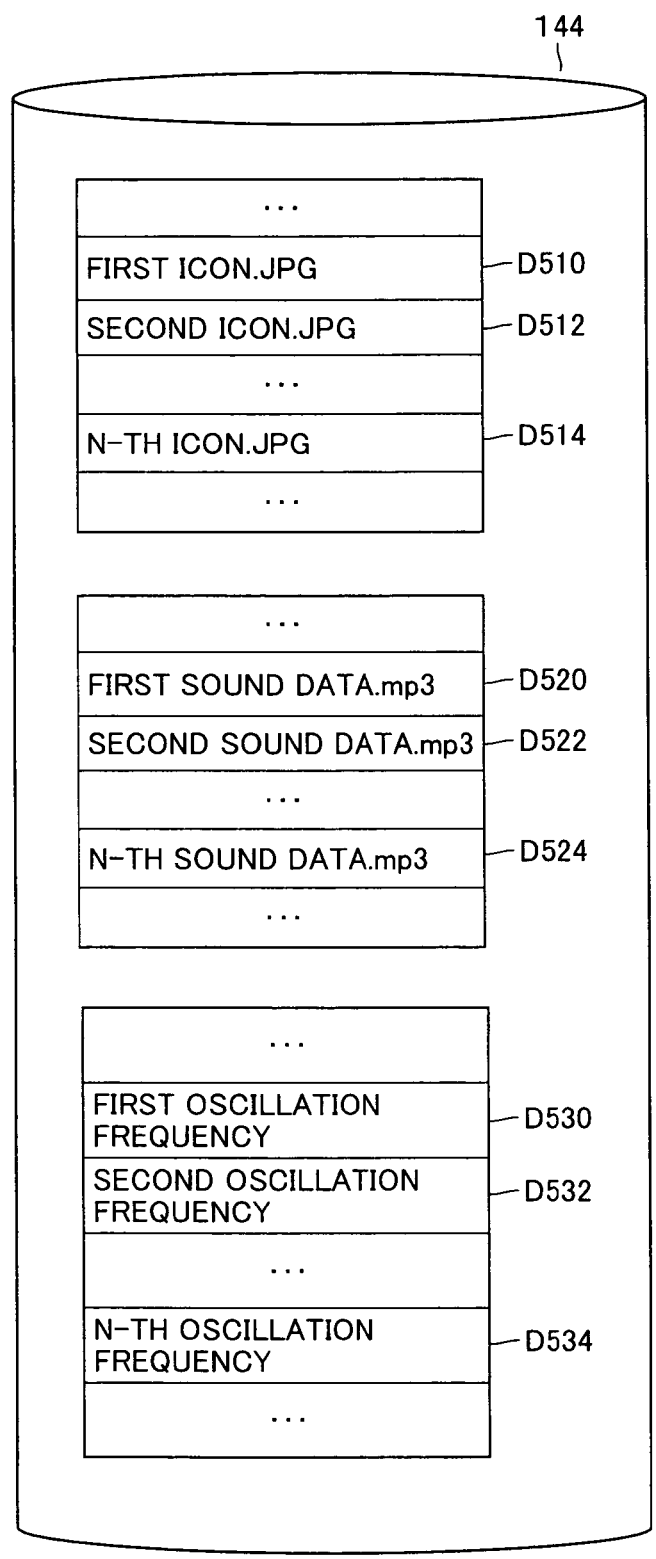

With reference to FIG. 5, a data structure of portable phone 100 according to the present embodiment will be further described. FIG. 5 is a view conceptually illustrating an aspect of storage of informing data in flash memory 144.

As illustrated in FIG. 5, for example, icon data for displaying icons is stored in data areas D510, D512, and D514. The data stored in the data areas may be data (for example, "first icon. JPG") prestored during manufacturing portable phone 100, data (for example, photographed images or images generated based on received data) acquired from the outside through portable phone 100, or image data edited and generated by the user.

Sound data is stored in data areas such as data areas D520, D522 and D524. The sound data may be either data prestored in flash memory 144 or sound data acquired from the outside through antenna 108, data communication IF 178 or memory card 182. Further, the data format of sound data is not particularly limited.

Data for oscillating vibrator 184 is stored in data areas D530, D532 and D534. The data is, for example, oscillation frequencies or oscillation intensities. When the data is read by control unit 110, vibrator 184 oscillates based on the data.

Figure 6:
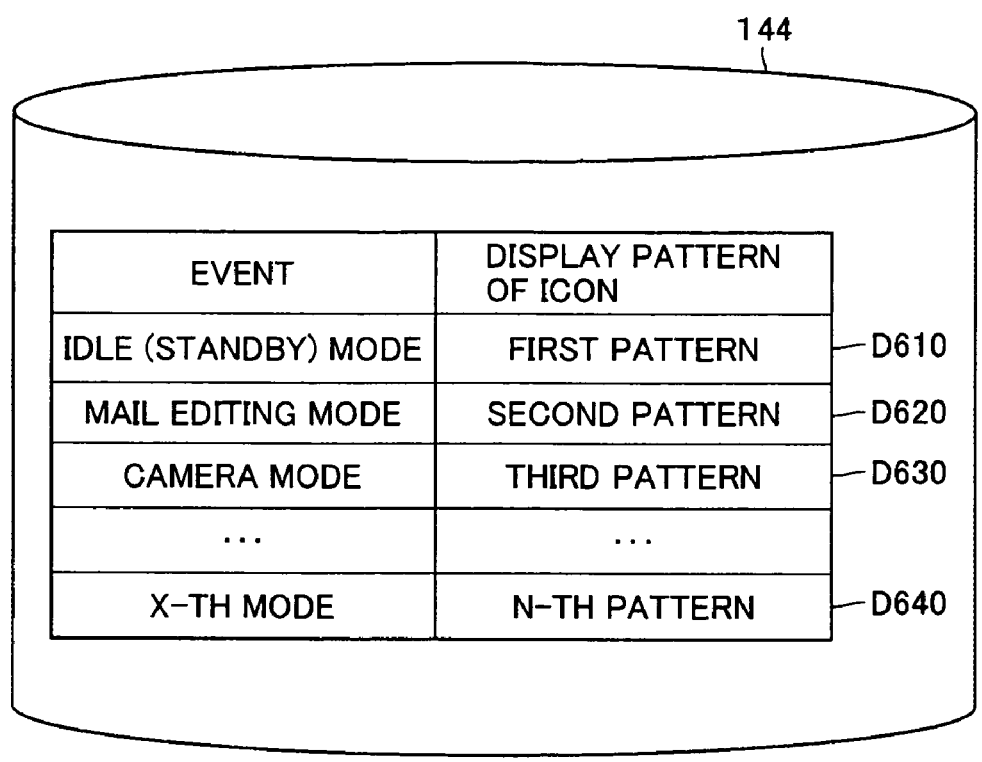

With reference to FIG. 6, a data structure of portable phone 100 according to the present embodiment will be further described. FIG. 6 is a view conceptually illustrating relation between the data designating the event modes and the data designating icon display patterns in flash memory 144.

A first pattern is associated with the idle mode (standby mode). The first pattern is stored in data area D610. A second pattern is associated with the mail editing mode. The data designating the second pattern is stored in data area D620. A third pattern is associated with the camera mode. The data designating the third pattern is stored in data area D630. An n-th pattern is associated with an x-th mode. The data designating the n-th pattern is stored in data area D640.

The data designating the first to the n-th patterns include position information preset for displaying icons on main display 150 or sub display 160. Here, the position information refers to the one for displaying icons in the row direction, information for displaying icons in the column direction, or information for displaying icons in relation with an arrangement of 12-keys. The aspect of this position information will be described later.

With reference to FIG. 7, a data structure in portable phone 100 according to the present embodiment will be further described. FIG. 7 is a view conceptually illustrating an aspect of data storage in RAM 146 of portable phone 100.

As illustrated in FIG. 7, position data for aligning and displaying icons in the row direction on main display 150 is stored in data areas D702 to D710. For example, a first display position (100, 100) is data for displaying a first icon at a lower-left portion on main display 150. Data stored in data area D704 is the one for displaying an icon at the right of the icon displayed based on the data stored in data area D702. When control unit 110 reads image data in association with the position data stored in data areas D702 to D710, five icons corresponding to the image data are displayed in the row direction in the image display area of main display 150.

Referring to FIG. 7 again, data stored in data areas D712 to D720 is position data for displaying five icons at the rightmost column of main display 150. When control unit 110 reads image data in association with the data, five icons corresponding to the image data are displayed in the rightmost column in the image display area on main display 150.

Similarly, data stored in data areas D722 to D746 is the one for displaying 13 icons in the uppermost row direction, the lowermost row direction and rightmost column direction in the image display area on main display 150. When control unit 110 reads image data in association with the data stored in data areas D722 to D746, 13 icons are displayed on main display 150, in accordance with the aforementioned arrangement.

Further, the output destination of icons to be displayed based on the data illustrated in FIG. 7 is not limited to main display 150. Similarly, icons may be output to sub display 160. In this case, when the size of the image display area of main display 150 is different from that of the image display area of sub display 160, the position data represented in the respective data areas shown in FIG. 7 may be converted in accordance with the size of the image display area of any one of these displays. This enables aligning and displaying a plurality of icons in portable communication terminals including two or more displays with different image display area sizes. Further, the number of icons displayed on the respective displays is not limited to the aforementioned number.

Figure 8:
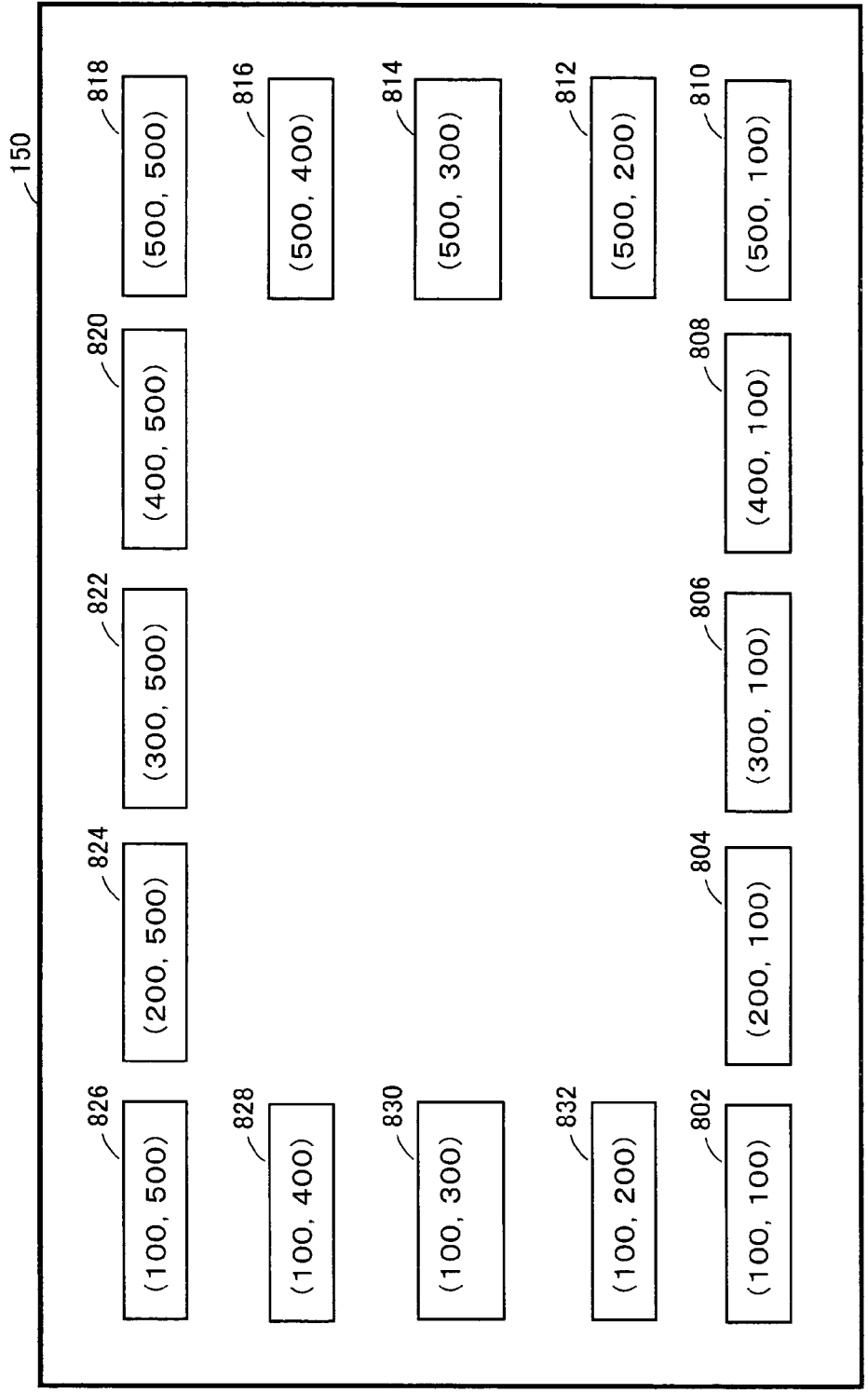
FIG. 8 is a view for describing icon display positions in the portable phone according to an embodiment of the present invention.

Here, with reference to FIG. 8, positions for icons displayed on main display 150 of portable phone 100 according to the present embodiment will be further described. FIG. 8 is a view conceptually illustrating an aspect of the display of icons in the image display area of main display 150.

Main display 150 is capable of arranging and displaying five icons in the direction of any one of the rows in the image display area. In this case, for example, icons 802 to 810, or icons 818 to 826 are displayed. At this time, the display position of icon 802 is represented, for example, as (100, 100) by using the dot display in the image displaying area. Similarly, the display position of an icon 804 displayed at the right of icon 802 is represented as (200, 100).

On the other hand, when five icons are displayed in the column direction on main display 150, position data having different Y-coordinate values is assigned to their display positions. For example, the position data of an icon 818 is represented as (500, 500). An icon 816 displayed below the icon has a position data of (500, 400). By varying the Y-coordinate values of the display positions of the respective icons, a plurality of icons can be displayed in the column direction of main display 150. Further, the aspect of representation of the position data in the image display area of the display is not limited to the one illustrated in FIG. 8.

With reference to FIG. 9, a data structure in portable phone 100 according to the present embodiment will be further described. FIG. 9 is a view illustrating an aspect of storage of record data for the respective functions in flash memory 144.

As illustrated in FIG. 9, the respective functions which can be executed by portable phone 100 are stored in a field F910. The number of times the respective functions have been actually activated is stored in a field F912. The date on which the respective functions were last activated is stored in a field F914.

For example, the function of replying by a voice mail service and transmitting reply mails when calls were received in the idle state (standby state) has been activated 111 times and the date on which the function was last activated is 12:34 56 seconds on Jan. 13, 2004 (data record R902). Similarly, the function of refusing incoming-call reception when a call was arrived in the idle state was activated 222 times and the date on which the function was last activated is 1:1 1 second on Feb. 29, 2004 (data record R904). When processes for the respective functions are executed, the number of times the function has been executed (field F912) is incremented by "1" in the data stored as described above. Further, the date on which the function was executed is updated and the data is overwritten in field F914. The aspect of the storage of the record data for the respective functions is not limited to the one illustrated in FIG. 9.

With reference to FIG. 10A and FIG. 10B, data structures in portable phone 100 according to the present embodiment will be further described. FIG. 10A is a view illustrating an aspect of storage of data for preferentially displaying icons associated with functions which have been most recently used. FIG. 10B is a view illustrating a data structure after the function associated with the n-th icon has been executed.

Referring to FIG. 10A, an identification data of a first icon having a first priority is stored in data area D1002. An identification data of a second icon having a second priority is stored in data area D1004. Similarly, identification data of the respective icons having a third to tenth priority are stored in data area D1006 to D1020. While the data structure is illustrated to have ten icons provided with priorities herein, the number of icons provided with priorities is not limited to this and may be other numbers.

Referring to FIG. 10B, when the user selects the n-th icon in this data structure, the identification data of the icon is stored in data area D1002 as the data which has been most recently used. Therefore, the data stored in data areas D1002 to D1018 are stored in order in data areas D1004 to D1020. Thus, when control unit 110 reads the identification data of the icons stored in the respective data areas in order to display the respective icons, the n-th icon is displayed at a position associated with the first priority since the n-th icon has the first priority.

Figure 11:
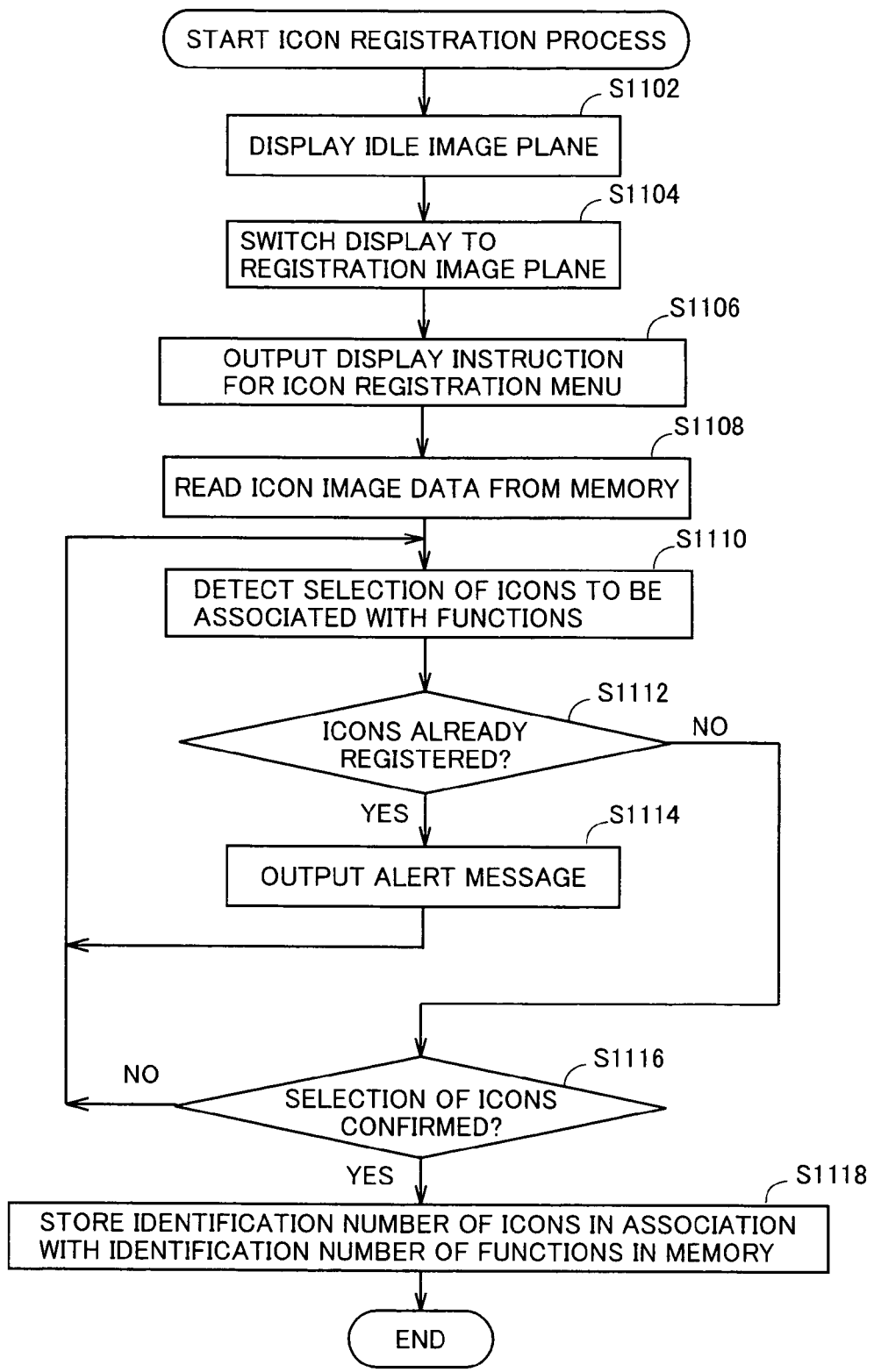
FIGS. 11 to 17 are flowcharts illustrating a procedure of processes executed by a control unit of the portable phone according to an embodiment of the present invention.

With reference to FIG. 11, a control structure of portable phone 100 according to the present embodiment will be described. FIG. 11 is a flowchart illustrating a procedure of icon registration processes executed by control unit 110 of portable phone 100. The processes are executed when the user displays an icon registration process menu by performing a predetermined key operation.

In step S1102, control unit 110 outputs data for displaying the idle image plane. In step S1104, control unit 110 switches the display to an icon registration image plane. In step S1106, control unit 110 outputs an instruction for displaying an icon registration menu. Thus, main display 150 displays a menu for registering icons in association with the respective functions of applications.

In step S1108, control unit 110 reads image data of icons from flash memory 144. When the data is read out, images based on the data is displayed on main display 150.

In step S1110, control unit 110 preceives that an icon to be associated with a function is selected, based on the user's operation through main operation unit 120. This detection is performed, for example, by determining whether or not the display position of the icon is in agreement with the operation instruction from main operation unit 120.

In step S1112, control unit 110 determines whether or not the icon has been already registered. This determination is performed, for example, based on icon registration data stored in flash memory 144. When the icon has been already registered (YES in step S1112), the process proceeds to step S1110. When it has not been registered (NO in step S1112), the process proceeds to step S1116.

In step S11116, control unit 110 determines whether or not the selection of the icon has been confirmed. This determination is performed, for example, by detecting whether or not the user has pushed a determination button (not shown) included in main operation unit 120. When the selection of the icon has been confirmed (YES in step S1116), the process proceeds to step S1118. When the selection of the icon has not been confirmed (NO in step S1116), the process returns to step S1110.

In step S1118, control unit 110 stores, in flash memory 144, the identification number of the selected icon in association with the identification number of the function (FIG. 4).

Further, similarly to the registration processes illustrated in FIG. 11, image planes which can be displayed in portable phone 100 may be associated with icons or other images. Namely, similarly to the process performed in step S1110, namely the process for inputting icons in association with function, names or identification information, such as identification numbers, of image planes may be associated with icons. In this case, similarly to the process in step S1118, the identification information of image planes and the identification numbers of icons are stored in flash memory 144. In this case, in response to changes of the display of image planes on main display 150 or sub display 160 of portable phone 100, icons associated with an image plane to be newly displayed can be displayed.

Figure 12:
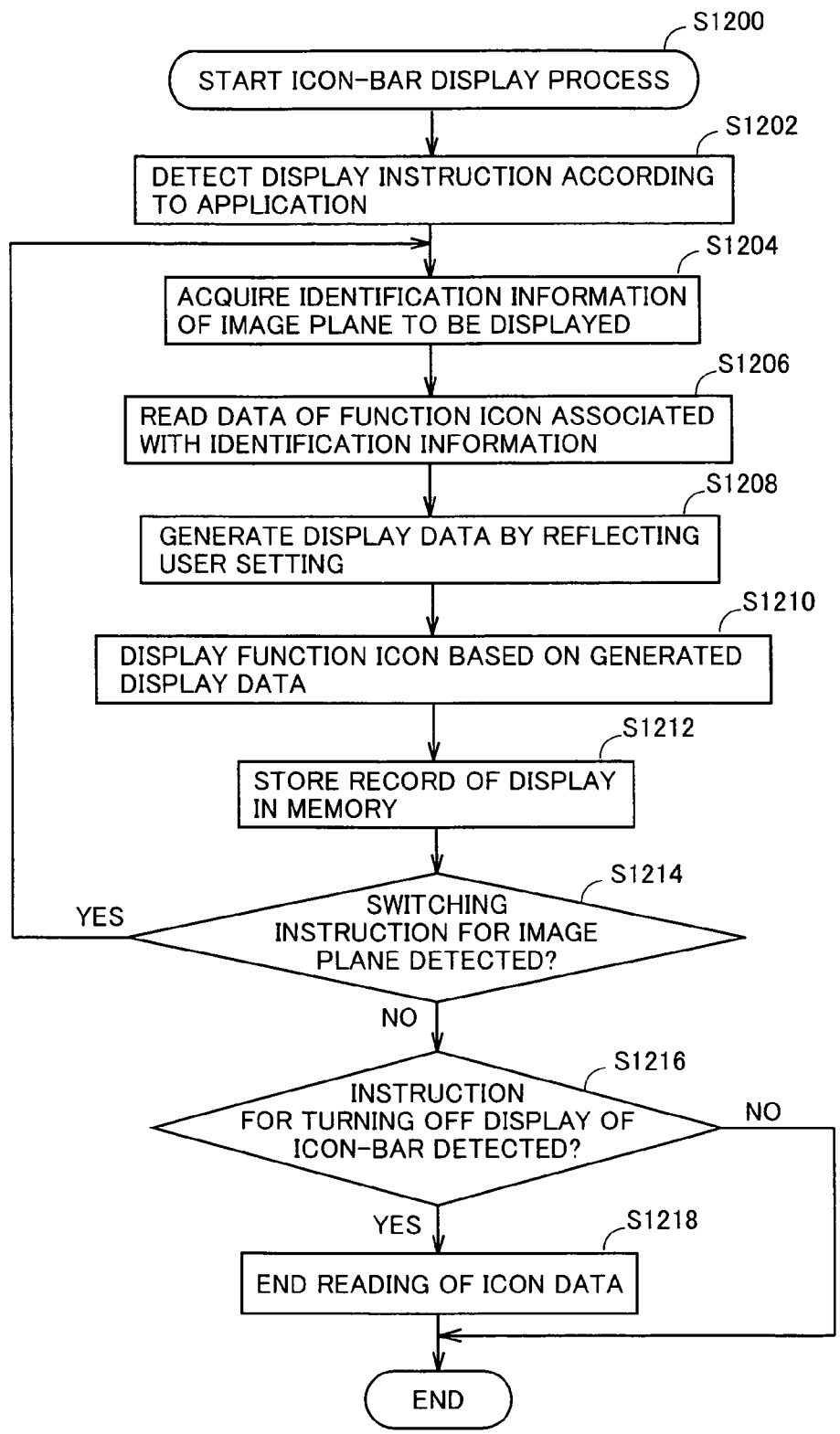

With reference to FIG. 12, a control structure of portable phone 100 according to the present embodiment will be further described. FIG. 12 is a flowchart illustrating a procedure of icon bar displaying processes executed by control unit 110. Here, an icon bar refers to an aspect of the display of a plurality of icons as a single group. These processes are performed, for example, in the case where a configuration of portable phone 100 is the one for displaying an icon bars.

In step S1202, control unit 110 detects an instruction for displaying an image plane according to an application. This detection is performed, for example, by acquiring data for identifying the application.

In step S1204, control unit 110 acquires the identification information of the image plane to be displayed. Here, the image plane to be displayed refers to an image plane to be displayed in response to the execution of applications. The image planes include, for example, the mail-editing image plane, an image plane for displaying a photographed object when the camera is activated, or an image plane for displaying phone-book data in which the information of communication partners has been recorded.

In step S1206, control unit 110 reads the data of function icons associated with the identification information of the image plane, from RAM 146. In step S1208, control unit 110 generates display data for displaying function icons by reflecting a preset configuration by the user on the read data. With this process, the data of function icons are rearranged based on the user's configuration (for example, rearrangement based on frequency information or rearrangement based on recent utilization record) for data stored in the memory, to generate data for display.

In step S1210, control unit 110 displays function icons based on the generated display data. Thus, main display 150 displays the respective icons. The aspect of the display of the icons will be described later.

In step S1212, control unit 110 stores the record of the display of function icons in flash memory 144. By storing the record data, in the case where, for example, the user selectively displays icons based on a particular priority, the icons can be displayed according to the user's setting.

In step S1214, control unit 110 determines whether or not an instruction for switching the image plane has been detected. This determination is performed, for example, based on whether or not the identification information of the image plane displayed on main display 150 has been changed. If the instruction for switching the image plane is detected (YES in step S1214), the process returns to step S1204. If not (NO in step S1214), the process proceeds to step S1216.

In step S1216, control unit 110 determines whether or not an instruction for turning off the display of an icon bar has been detected. This determination is performed, for example, based on a result of detection as to whether or not the user has performed an operation for turning off the display of an icon bar by operating main operation unit 120. For example, when the function of turning off the display is assigned to a particular operating key, such detection can be achieved. If the instruction for turning off the display of an icon bar has been detected (YES in step S1216), the process proceeds to step S1218. If not (NO in step S1216), the process ends.

In step S1218, control unit 110 ends reading of display data. Thus, when an icon bar has been displayed on main display 150, the display of the bar is turned off.

Figure 13:
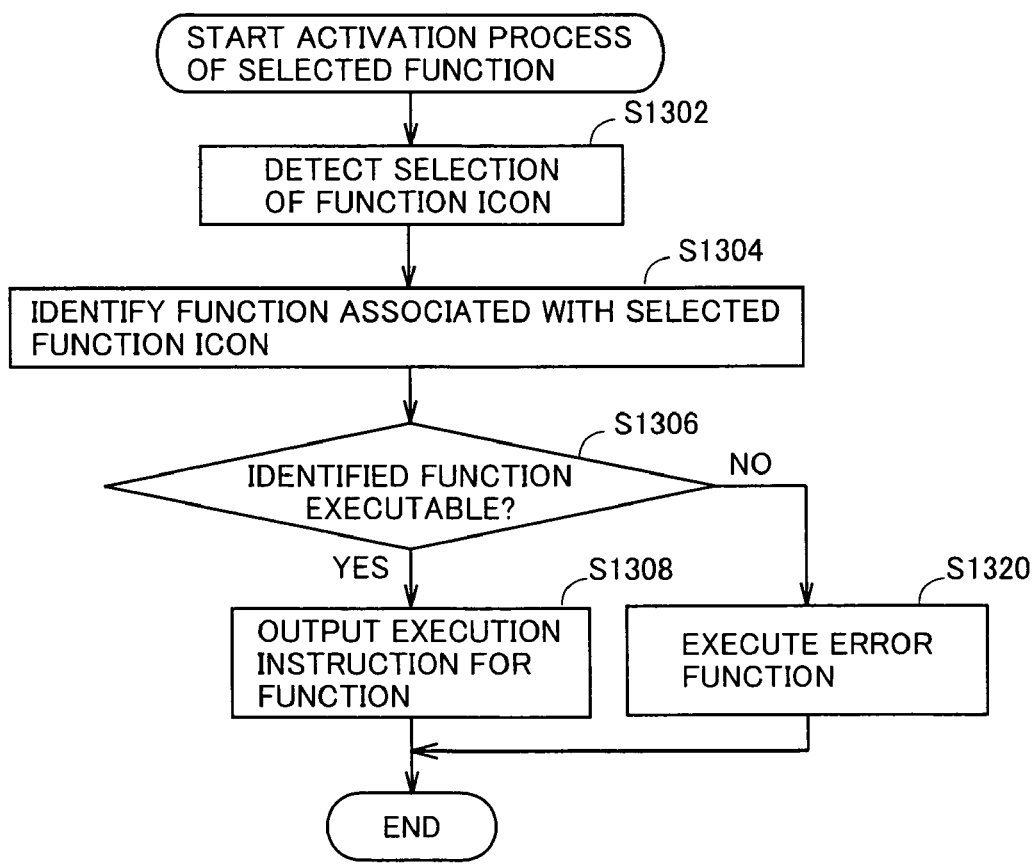

With reference to FIG. 13, a control structure in portable phone 100 according to the present embodiment will be further described. FIG. 13 is a flowchart illustrating a procedure of a selecting function activating process executed by control unit 110. This process is executed, for example, when the user selects a particular function icon from a displayed icon bar and presses a determination button (not shown).

In step S1302, control unit 110 detects that a function icon has been selected. In step S1304, control unit 110 identifies the function associated with the selected function icon. This identification is achieved based on the data of the function icons stored in flash memory 144.

In step S1306, control unit 110 determines whether or not the identified function can be executed. This determination is performed by determining whether or not there exists a program for executing the function. If the function can be executed (YES in step S1306), the process returns to step S1308. If not (NO in step S1306), the process proceeds to step S1320.

In step S1308, control unit 110 outputs an instruction for executing the identified function. In step S1320, control unit 110 performs predetermined error processes. The processes include, for example, the outputting of a massage for giving notice that the function can not be executed, light emission from LED 176 (for example, light emission from a red LED), oscillation of vibrator 184 or other informing operations.

Figure 14:
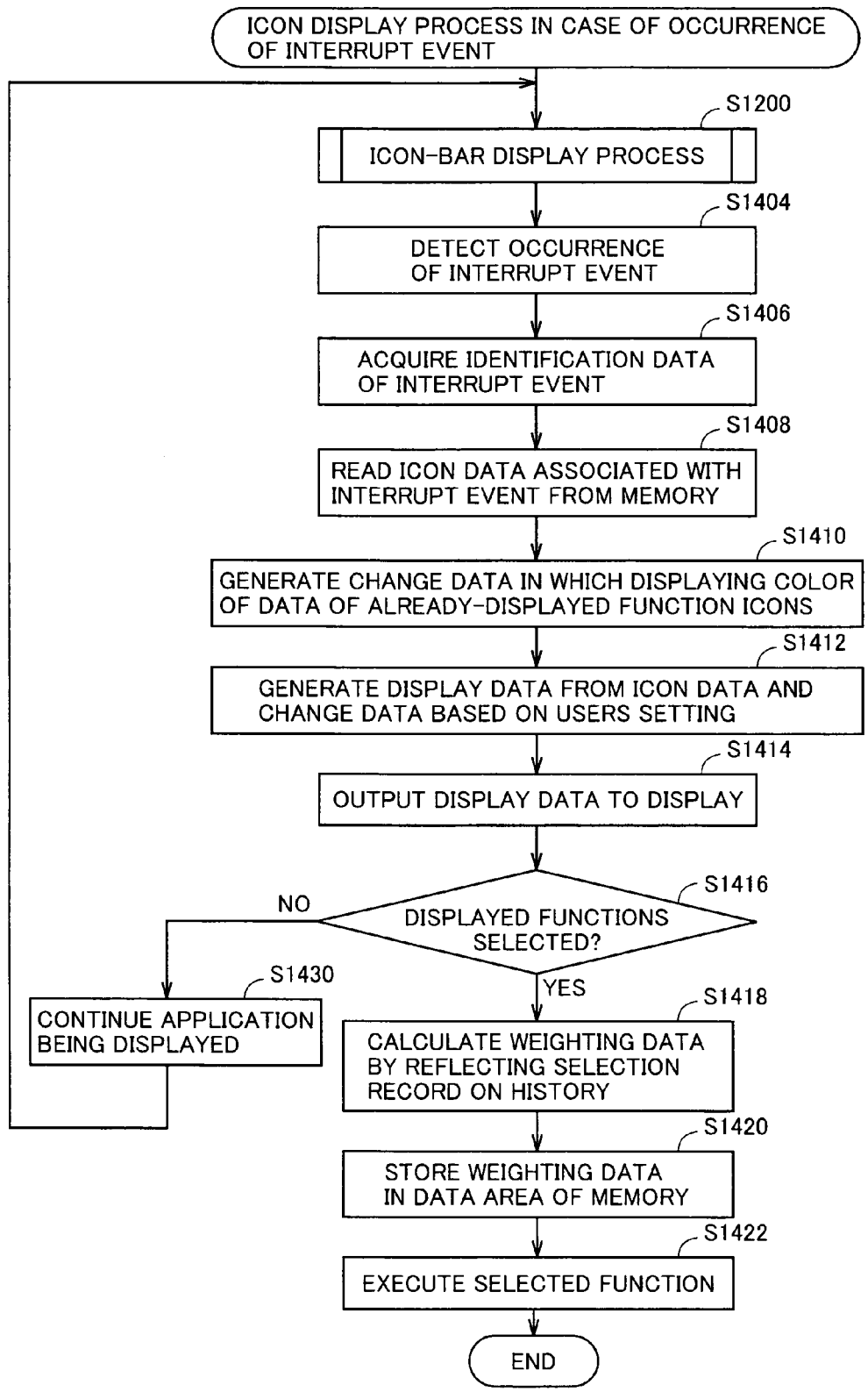

With reference to FIG. 14, a control structure of portable phone 100 according to the present embodiment will be further described. FIG. 14 is a flowchart illustrating a procedure of an icon displaying process executed by control unit 110. This process is executed in the event that an interrupt event occurs when an icon bar has already been displayed. Namely, this is executed in the event that an interrupt event occurs when the icon bar displaying process (step S1200) is being executed. Here, interrupt events refer to states which cause a process different from a currently-executed process to be executed. For example, these states include incoming-call reception during mail editing, or switching of the display of the image plane by the user's operation.

In step S1404, control unit 110 detects an occurrence of an interrupt event. This detection is achieved, for example, by detecting signals input from the outside or detecting changes of the identification number of the image plane to be displayed.

In step S1406, control unit 110 acquires an identification data of the interrupt event. In step S1408, control unit 110 reads out the icon data associated with the interrupt event from RAM 146.

In step S1410, control unit 110 generates changing data in which the display color of the data of function icons which have been already displayed is changed. For example, in the case where this process is executed when icons are displayed in predetermined colors, the display of the icons are grayed out.

In step S1412, control unit 110 generates display data from the icon data and the changing data based on the user's configuration. For example, when the user set the function associated with the interrupt event to be preferentially executed, the position data of the center portion of the icon bar is associated with the icon data associated with the interrupt event. In this case, the data for displaying the icon at the center portion is reflected on the generated display data. Therefore, the data of an icon which has been already displayed at the center portion is generated by reflecting the data of the position adjacent to the center portion (for example, right or left, or, above or below).

In step S1414, control unit 110 outputs the display data to main display 150. Thus, main display 150 displays function icons associated with the interrupt event, in addition to function icons displayed when step S1202 was executed. At this time, in order to display the function icon associated with the interrupt event, one of the already-displayed function icons is not displayed.

In step S1416, control unit 110 determines whether or not the displayed functions have been selected. This determination is performed, for example, based on whether or not the user has selected a function icon through main operation unit 120 and pushed the determination button. If the displayed function has been selected (YES in step S1416), the process proceeds to step S1418. If not (NO in step S1416), the process proceeds to step S1430.

In step S1418, control unit 110 calculates weighting data by reflecting the record of the selection of function icons on the history. In step S1420, control unit 110 stores the calculated weighting data in data areas of flash memory 144. In step S1422, control unit 110 performs the function associated with the selected function icon. In step S1430, control unit 110 continues the process of the application being displayed, namely the application which had been executed before the occurrence of the interrupt event.

Figure 15:
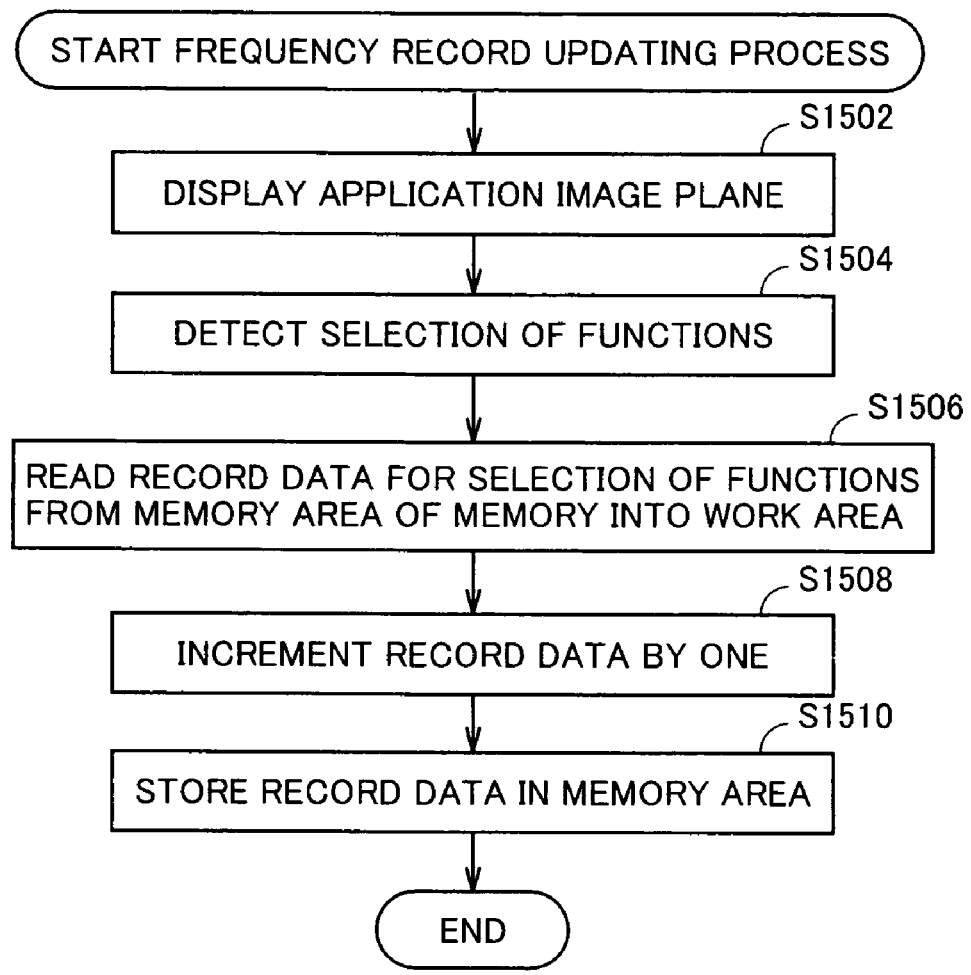

With reference to FIG. 15, a control structure of portable phone 100 according to the present embodiment will be further described. FIG. 15 is a flowchart illustrating a procedure of a frequency record updating process executed by control unit 110. This process is performed, for example, when it is detected that the respective functions of portable phone 100 are executed. Here, the execution of functions includes the direct execution of functions through the selection of icons and the execution of functions through conventionally-included menus.

In step S1502, control unit 110 displays an application image plane. Here, the application image plane refers to an image plane which is first displayed when any of the functions is executed. In step S1504, control unit 110 detects a function being selected. In step S1506, control unit 110 reads the record data for the selection of functions from a storage area of flash memory 144 into a work area.

In step S1508, control unit 110 increments, by "one", the record data for the function which was detected to be selected. In step S1510, control unit 110 stores the updated record data in the storage area of flash memory 144.

Figure 16:
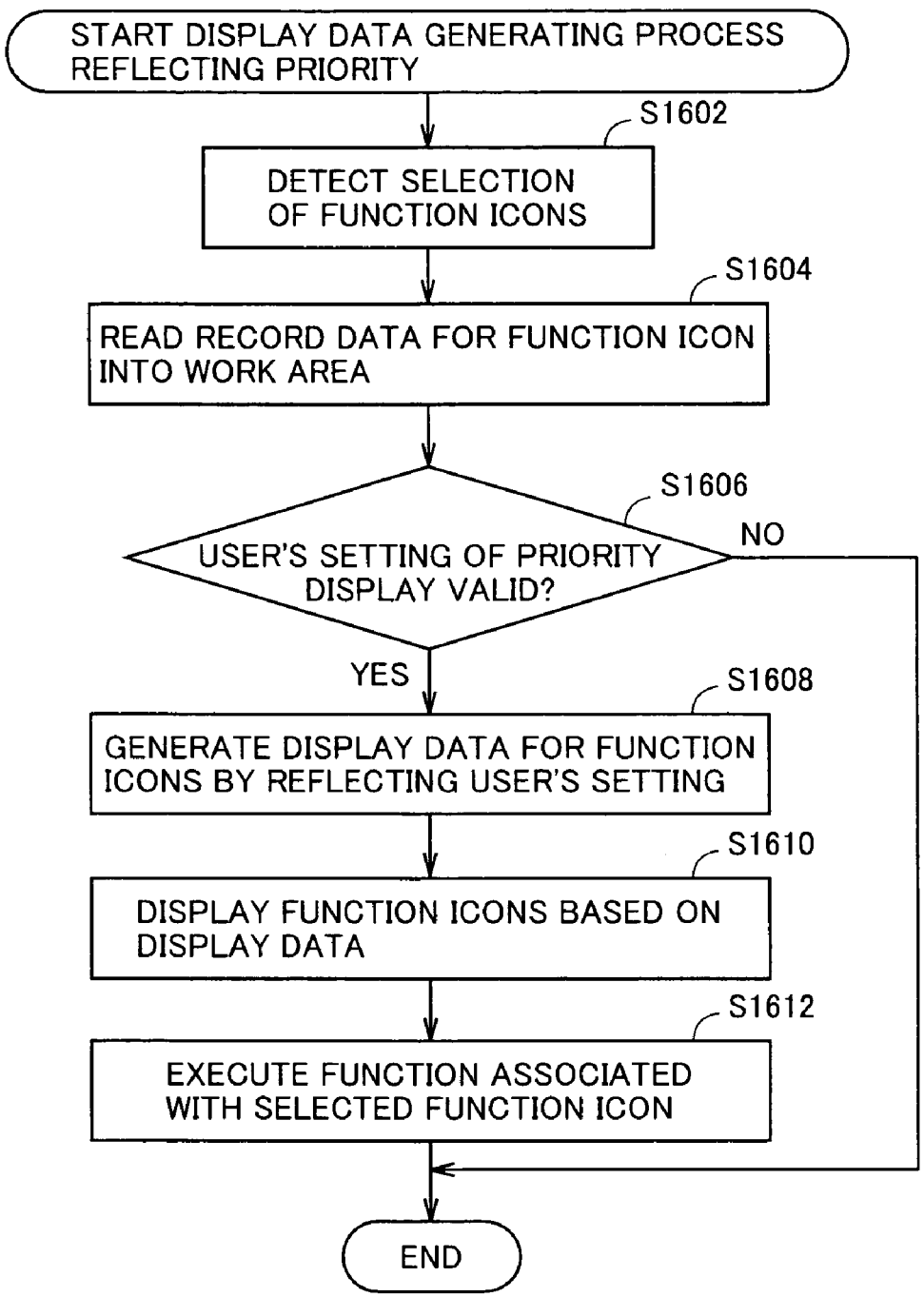

With reference to FIG. 16, a control structure of portable phone 100 according to the present embodiment will be further described. FIG. 16 is a flowchart illustrating a procedure of a display-data generating process executed by control unit 110. This process is executed when the user set the display based on priorities to be valid.

In step S1602, control unit 110 detects a function icon being selected. In step S1604, control unit 110 reads the record data for the respective function icons into the work area of RAM 146. In step S1606, control unit 110 determines whether or not the user set the priority-display to be valid. If the user set the priority-display to be valid (YES in step S1606), the process proceeds to step S1608. If not (NO in step S1606), the process ends.

In step S1608, control unit 110 generates display data for the function icons by reflecting the user's configuration thereon. In step S1610, control unit 110 displays the function icons based on the display data. In step S1612, control unit 110 performs the function associated with the selected function icon.

Figure 17:
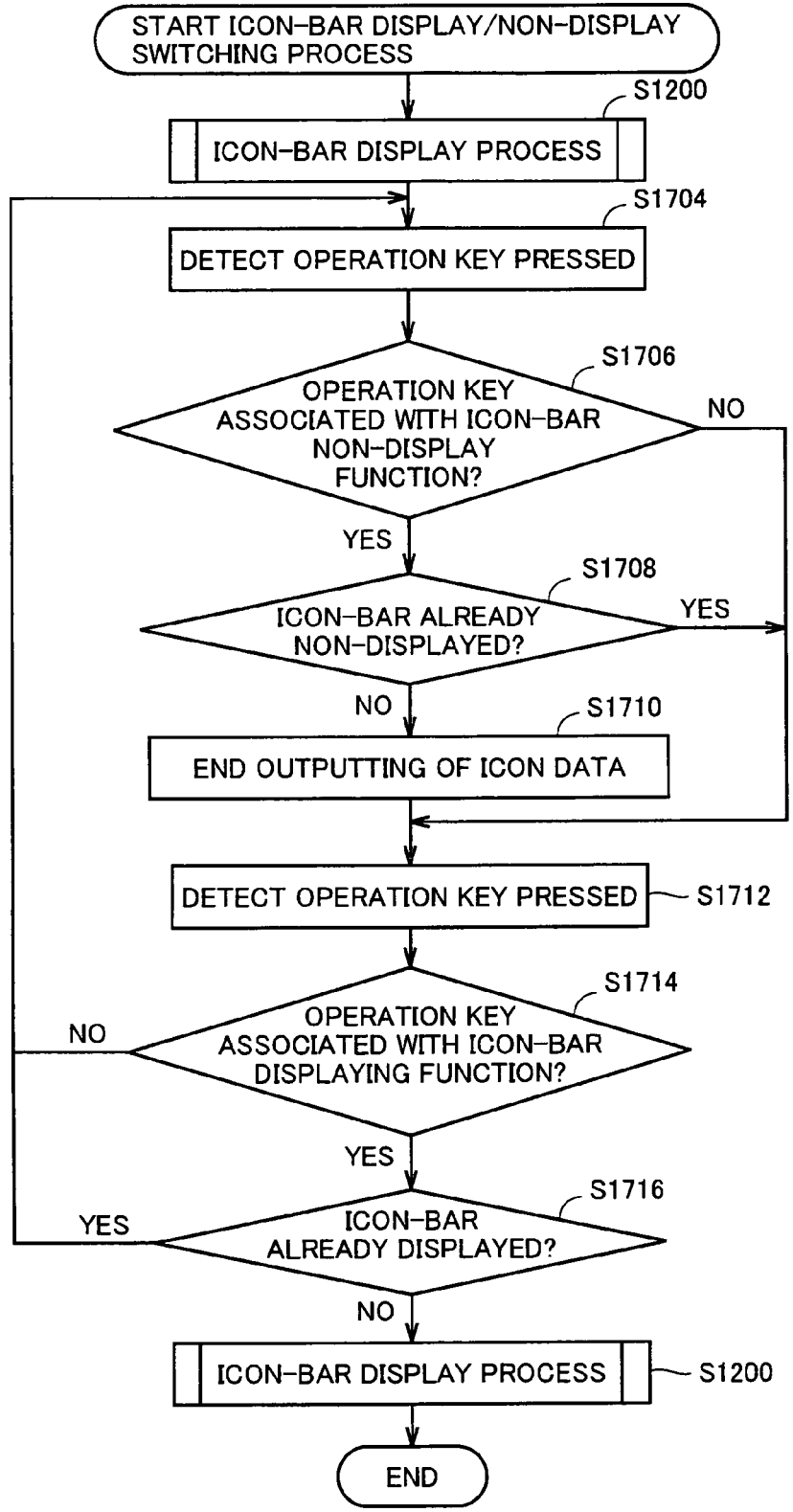

With reference to FIG. 17, a control structure of portable phone 100 according to the present embodiment will be further described. FIG. 17 is a flowchart illustrating a procedure of an icon-bar display/non-display switching process executed by control unit 110. This process is performed, for example, in the event that the user pushes a predetermined operation key to order non-display when an icon bar is displayed or in the event that the user gives an instruction for displaying when no icon bar is displayed.

In step S1704, control unit 110 detects a particular operation key in main operation unit 120 having been pushed. In step S1706, control unit 110 determines whether or not the operation key is a key associated with the icon-bar non-display function. This determination is performed, for example, based on whether or not the pushed key is associated with the non-display function. If the operation key is associated with the icon-bar non-display function (YES in step S1706), the process proceeds to step S1708. If not (NO in step S1706), the process proceeds to step S1712.

In step S1708, control unit 110 determines whether or not there is already no icon bar being displayed. If there is no icon bar being displayed (YES in step S1708), the process proceeds to step S1712. If not (NO in step S1708), the process proceeds to step S1710.

In step S1710, control unit 110 ends outputting the data of function icons. Thus, non-display of icon bars on main display 150 is set up.

In step S1712, control unit 110 detects an operation key in main operation unit 120 being pushed.

In step S1714, control unit 110 determines whether or not the operation key is associated with the icon-bar display function. This determination is performed, for example, based on whether or not the pushed key is associated with the icon-bar display function. If the operation key is associated with the icon-bar displaying function (YES in step S1714), the process proceeds to step S1716. If not (NO in step S1714), the process proceeds to step S1704.

In step S1716, control unit 110 determines whether or not an icon bar is already displayed. If an icon bar is already displayed (YES in step S1716), the process proceeds to step S1704. If not (NO in step S1716), the process proceeds to step S1200.

An operation of portable phone 100 based on the aforementioned structures and the flowcharts according to the present embodiment will be described with reference to displayed image planes. FIGS. 18A to 26 are views illustrating aspects of the display of image planes on main display 150 of portable phone 100.

Icon Registration Process

When portable phone 100 displays an idle image plane (step S1102), if the user orders switching of the display from the image plane to an icon registration image plane (step S1104), the image data of icons is read from flash memory 144 and main display 150 displays the respective icons (step S1108). When the user selects an icon for a function to be associated therewith (step S1110), if the icon has not been registered yet (NO in step S1112), the identification number of the function displayed by the image plane is stored in flash memory 144 in association with the identification number of the icon (step S1118). Thus, the user can associate icons with the respective functions.

Icon Bar Display Process

When the user set up the icon bar displaying process to be valid, it is found that the image plane on main display 150 is switched (step S1202) and the identification information of the image plane is acquired (step S1204). The data of function icons associated with the image plane is read and the display data is generated (step S1208). Then, the function icons are displayed on main display 150 (step S1210, FIG. 18A).

Figure 18A:
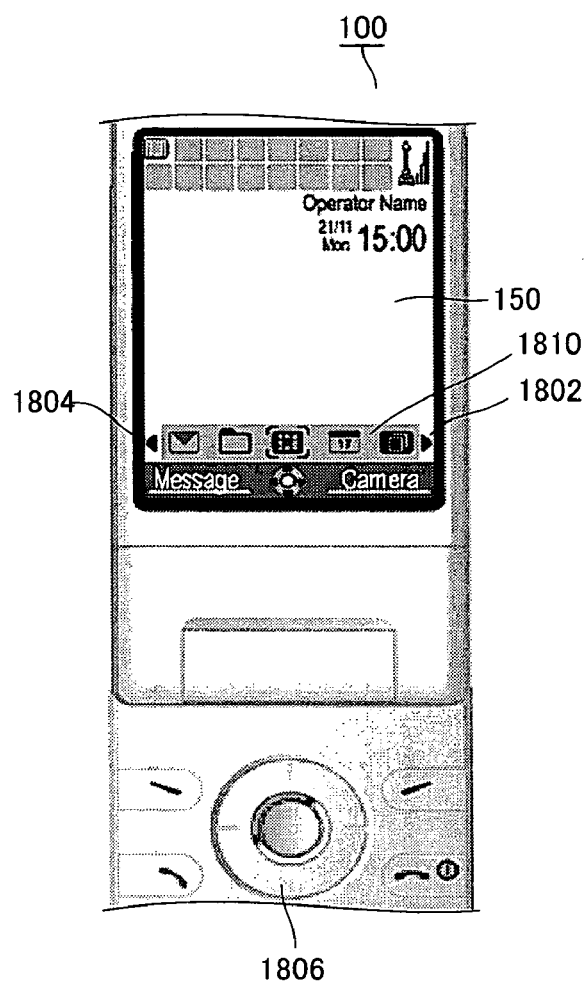
FIGS. 18A to 25 are views for describing an icon display state on a display of the portable phone according to an embodiment of the present invention.

Here, referring to FIG. 18A, an icon bar 1810 is set up in advance so as to display five icons. Further, there are provided arrows 1802, 1804 at the opposite ends of icon bar 1810 and therefore the user can change, in order, the display of individual function icons displayed in icon bar 1810 by operating a right/left moving key 1806 in main operation unit 120.

If the user further switches the image plane when icon bar 1810 is displayed on main display 150 (YES in step S1214), the function icons associated with the image plane after switching are read out and a new icon bar 1810 is displayed. If the user does not perform such switching or does not instruct turning off the display of the icon bar (NO in step S1216), icon bar 1810 is continuously displayed.

Figure 18B:
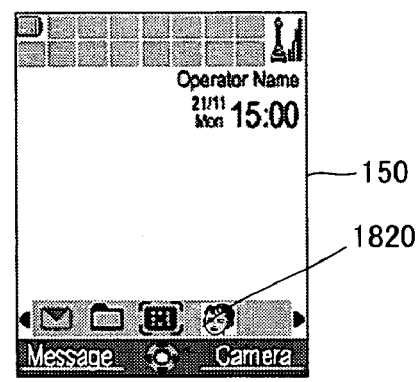

Here, referring to FIG. 18B, the respective function icons included in icon bar 1810 will be described. As illustrated in FIG. 18B, in order to avoid concrete display of particular function icons, a predetermined particular bar 1820 can be used. By using such bar 1820, the display of particular functions may be made irrelevant to the contents of the functions, thereby protecting the privacy of the user of portable phone 100.

Figure 19A:
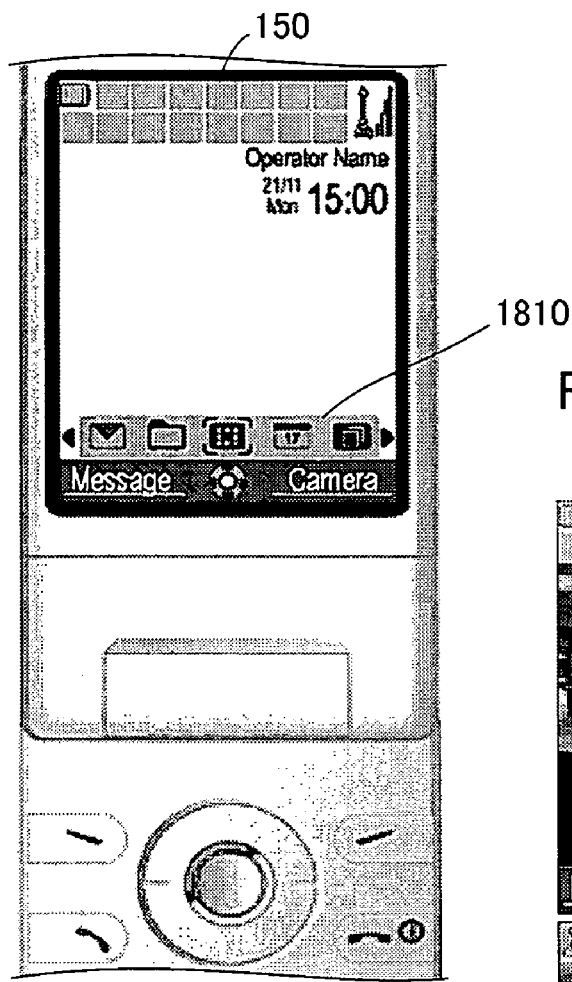
Figure 19B:
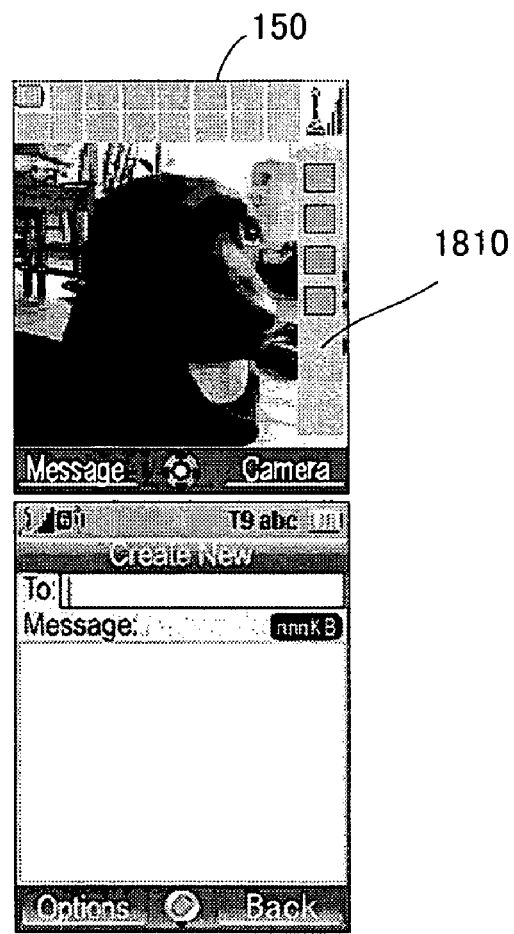

Referring to FIG. 19A and FIG. 19B, an aspect of display of icon bar 1810 on main display 150 of portable phone 100 according to the present embodiment will be described. FIG. 19A and FIG. 19B are views illustrating the aspect of the display of icon bar 1810 on main display 150.

As illustrated in FIG. 19A, if icon bar 1810 is set up so as to be horizontally displayed, icon bar 1810 is displayed such that changes of the display in the row direction can be performed. On the other hand, if the setting of display of icon bar 1810 in the column direction is valid, icon bar 1810 is displayed at the right end or the left end on main display 150 as illustrated in FIG. 19B. Further, the user may change the aspect of the display of this icon bar 1810 by operating a particular operation key (not shown), when it is already displayed. Also, the display of icon bar 1810 may be set to be changeable according to the image plane being displayed.

Selection Function Activation Process

Next, there will be further described an operation of portable phone 100 in the case where a particular function icon is selected when an icon bar is displayed. When portable phone 100 displays a particular image plane and an icon bar including function icons associated with the image plane, if the user selects a particular function icon (step S1302), the function associated with the icon is identified (step S1304). If the identified function can be executed (YES in step S1306), an instruction to execute the function is output (step S1308) and the function is actually realized. Thus, the user is not required to display the menu, again, in order to execute the function, thereby easily and rapidly starting the function.

Icon Displaying Process Upon Occurrence of Interrupt Events

Next, with reference to FIG. 20A and FIG. 20B, there will be described operations of portable phone 100 in the case where an interrupt event occurs when an icon bar is displayed.

Figure 20A:
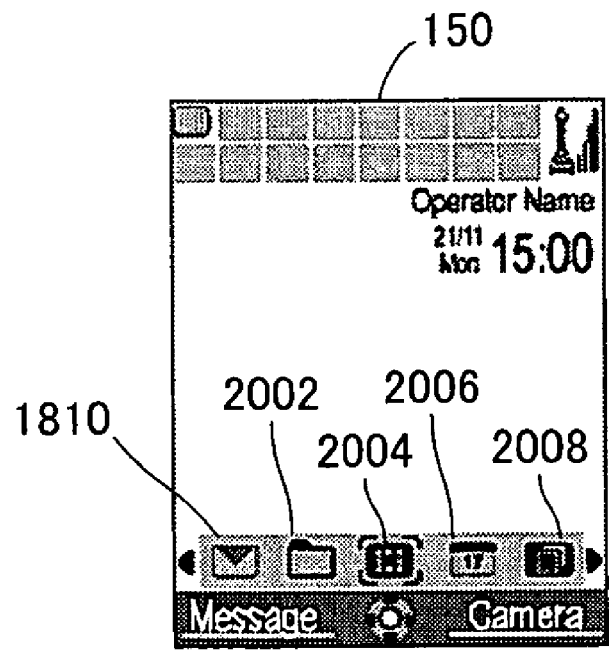

FIG. 20A is a view illustrating a displayed image plane when main display 150 of portable phone 100 is in the idle state. FIG. 20B is a view illustrating a displayed image plane on main display 150 when an incoming call is received.

When portable phone 100 is in the idle state, a predetermined icon bar 1810 is displayed (step S1200, FIG. 20A). If an incoming call is received when portable phone 100 is in the standby state (step S1404), the identification data of incoming-call reception is acquired (step S1406). The icon data associated with call reception is read out from flash memory 144 (step S1408).

Here, referring to FIG. 20A, the respective icons 2002 to 2008 included in icon bar 1810 may be images associated with the functions. For example, in addition to images indicating the contents of the functions, symbols and characters may be employed.

For the data of the function icons already displayed on main display 150, data in which the display color of the data is changed is generated (step S1410). Data for displaying function icons again on main display 150 is generated based on the icon data associated with incoming-call reception and the generated data (step S1412). When the generated data is output to main display 150 (step S1414), main display 150 of portable phone 100 displays the function icon associated with incoming-call reception at the center of icon bar 1810 based on a predetermined setting by the user and other icons are displayed at the right and left of the icon (FIG. 20B).

Figure 20B:
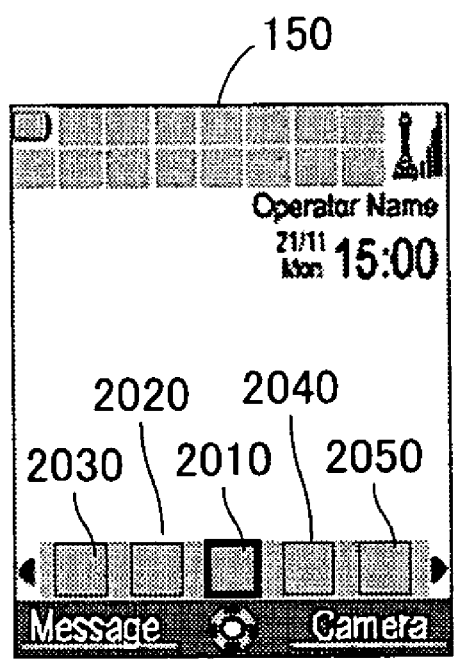

Here, referring to FIG. 20B, an icon 2010 is displayed emphatically. This icon 2010 is associated with the function of sending a mail of "I am busy now and will call you back later", in addition to a reply by voice mail service. An icon 2020 is associated with, for example, the function of reply by a first voice mail service. This function is, for example, the one of reply by a message saying "I am absent now . . . ". An icon 2030 is associated with, for example, the function of the reply by a second voice mail service. This function is, for example, the one of the reply by a message saying "I will come back to home by five o'clock. Please call again." An icon 2040 is, for example, the one of refusing incoming-call reception. An icon 2050 is a function of outputting only sound, for example, when an incoming call from a TV phone is received. Also, the functions associated with the icons illustrated in FIG. 20B may be other functions.

Then, if the user selects the function icon associated with incoming-call reception (YES in step S1416), the record of the selection is reflected on the history and weighting data is calculated (step S1418). This data is stored in the memory (step S1420) and the function selected by the user is executed (step S1422).

Figure 21A:
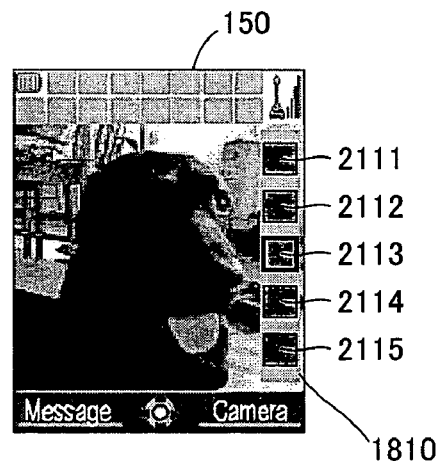
Figure 21B:
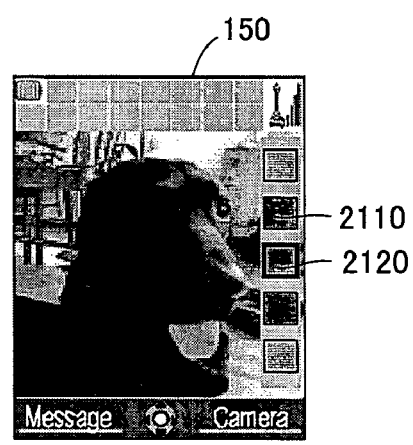
Figure 21C:
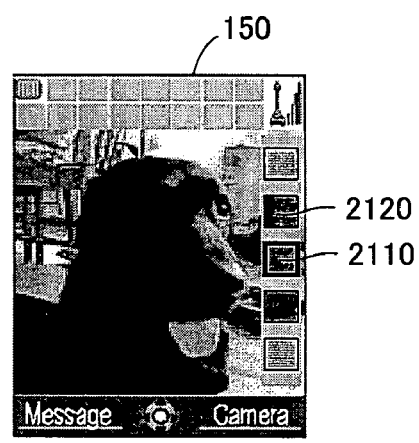

Here, aspects of the display in portable phone 100 according to the present embodiment will be further described with reference to FIG. 21A to FIG. 21C. FIG. 21A to FIG. 21C are views illustrating the aspects of the display on main display 150 in the event that an interrupt event occurs in portable phone 100.

As illustrated in FIG. 21A, when portable phone 100 is, for example, in a camera photographing mode, icon bar 1810 is displayed at the right column on main display 150. The respective icons included in this icon bar 1810 are associated with an icon 2111 for the function of photographing moving pictures, an icon 2112 for the function of bar code recognition, an icon 2113 for the function of an OCR, an icon 2114 for the function of changing the size, and an icon 2115 for the function of image effects.

At this state, if portable phone 100 receives a mail, icons relating to mail processing are displayed in icon bar 1810. In this case, for example, when the setting is such that the center position of icon bar 1810 has the highest priority, an icon 2120 associated with the function of reading the received mail is emphatically displayed, as shown in FIG. 21B. The aspects of the emphasis include, in addition to an aspect of emphatically displaying a perimeter as shown in FIG. 21B, an aspect of blinking the icon, an aspect of turning off the display of the other icons and other aspects.

In a case that portable phone 100 received a mail, if the user selects an icon 2110 associated with the function of "responding by citing the mail", the record of this icon is updated. Therefore, if a mail is received next time, the icon will be displayed at the center position. Namely, as illustrated in FIG. 21C, this icon 2110 will be emphatically displayed at the center position of icon bar 1810, instead of an icon 2120.

Figure 22A:
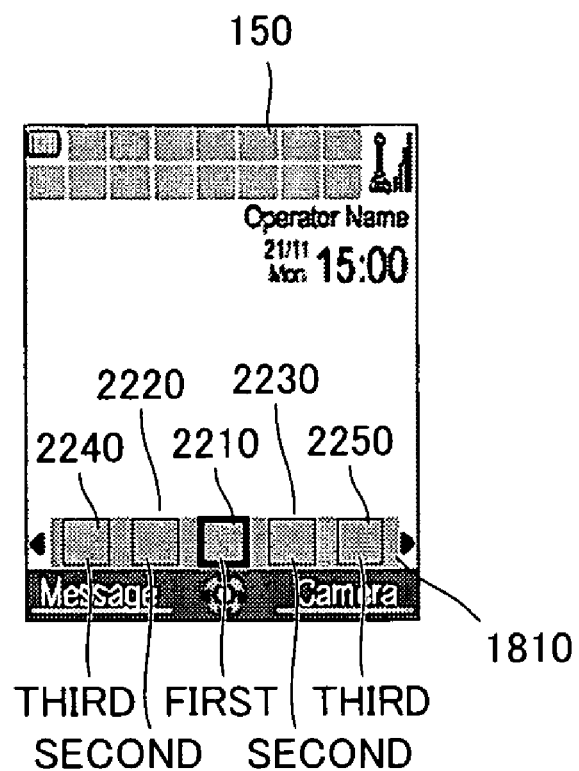
Figure 22B:
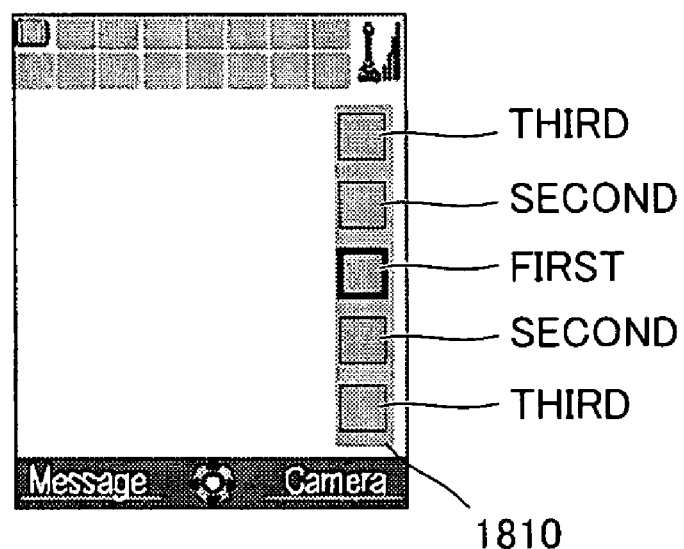

Next, the aspect of the display of icons on main display 150 will be described with reference to FIG. 22A and FIG. 22B. FIG. 22A is a view illustrating relation between the icon display positions and the priorities in the case where icon bar 1810 is displayed at the lowermost row in the image display area of main display 150. FIG. 22B is a view illustrating relation between the icon display positions and the priorities in the case where icon bar 1810 is displayed at the right row in the image display area of main display 150.

Referring to FIG. 22A, when five icons are displayed in icon bar 1810, for example, a first priority is associated with an icon 2210 placed at the center. A second priority is associated with icons 2220, 2230. A third priority is associated with icons 2240, 2250. Namely, the priorities are set such that they are degraded from the center position to peripheral positions. Further, as illustrated in FIG. 22B, this is the same for the case where icon bar 1810 is displayed in the column direction.

Namely, in portable phone 100 and other portable communication terminals, in the case where a plurality of images are displayed in the image display area, the priority of the center display position may be set high in view of enhancing the operability. Therefore, for example, when a plurality of icons are displayed in icon bar 1810, by displaying an icon having a highest priority at the center of the area for displaying icons, the user can select a particular function through a minimized amount of operation (the number of times that buttons are pushed) of moving keys (not shown) in main operation unit 120. As a result, the usability of portable phone 100 can be improved.

Also, when icon bar 1810 displayed in the row direction on main display 150 becomes obstruction for images being displayed, the display position of icon bar 1810 may be changed from the lowermost field to the rightmost column as illustrated in FIG. 22B. In this case, similarly, by assigning the highest priority to the center icon out of the plurality of icons as previously described, the user can select an icon from icons having high priorities to low priorities by pushing up/down moving key 121 of main operation unit 120. This may also reduce an operation required for movement.

Figure 23A:
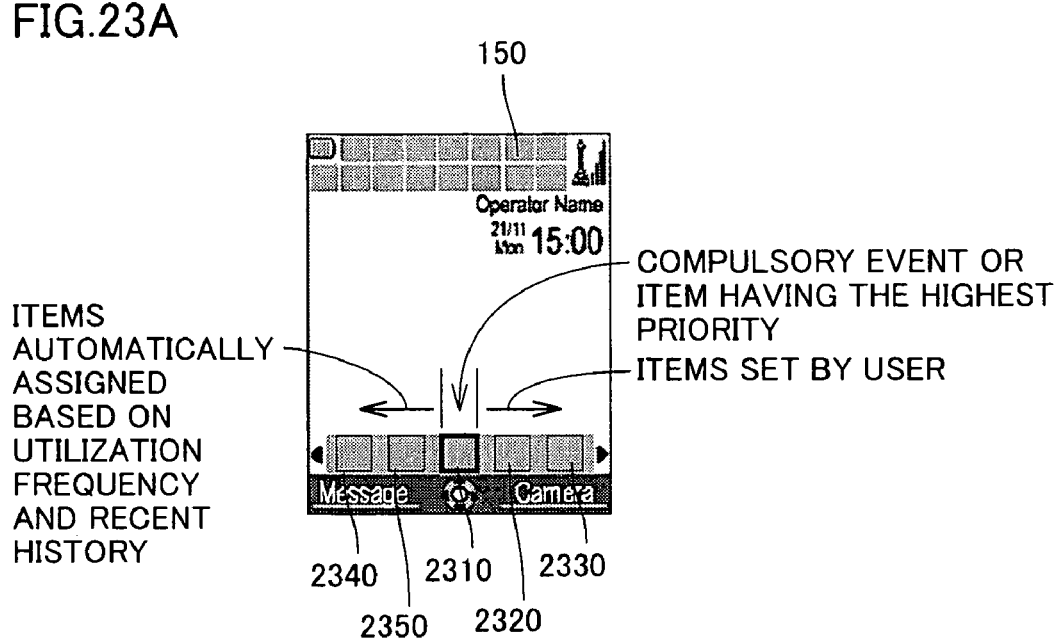
Figure 23B:
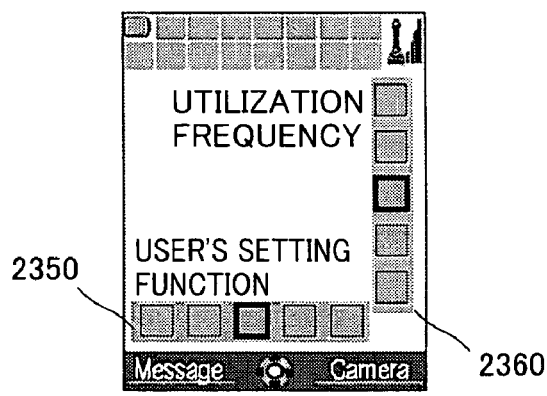

With reference to FIG. 23A and FIG. 23B, aspects of the display on main display 150 of portable phone 100 according to the present embodiment will be further described. FIG. 23A is a view illustrating an aspect of the display of icons having a plurality of attributes in icon bar 1810. FIG. 23B is a view illustrating an aspect of the display of a plurality of icon bars 2350 and 2360 in main display 150.

As illustrated in FIG. 23A, main display 150 may display an icon 2310 having the highest priority, out of the plurality of icons, at the center portion and may display icons at the right and left of the icon based on different attributes. In this case, for example, icons 2320, 2330 required to be preferentially displayed by the user's setting are displayed at the right of icon 2310 having the highest priority. On the other hand, icons 2340, 2350 automatically set to be displayed based on the user's utilization record may be set at the left of icon 2310. This enables displaying icons according to the user's utilization condition, thereby further improving the usability of portable phone 100.

Also, as illustrated in FIG. 23B, display 150 may display a plurality of icon bars 2350, 2360 concurrently. In this case, main display 150 may display icons based on particular attributes in respective icon bars 2350, 2360. For example, main display 150 may display the respective icons based on the utilization frequency and the user's setting. Thus, the plurality of icon bars 2350, 2360 are always displayed in the case where there is no restriction on the display of images on main display 150. Therefore, the user can perform operation efficiently. For example, when the user utilizes many functions such as editing of documents or reference to plural data, the user can advance the processes efficiently based on the display illustrated in FIG. 23B.

Figure 24A:
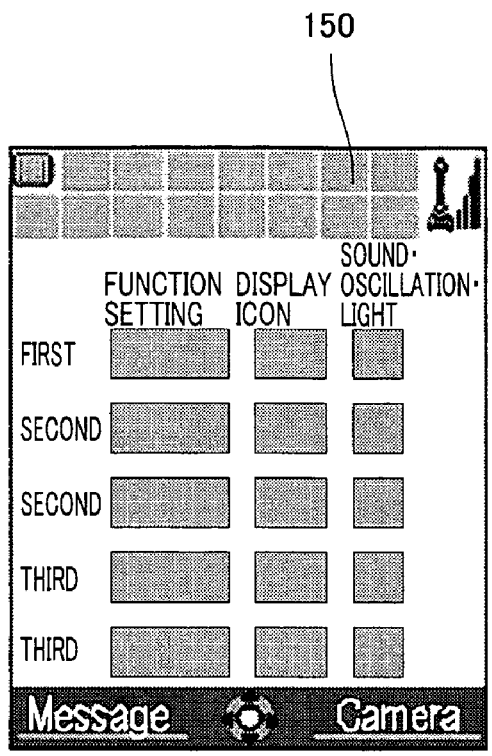
Figure 24B:
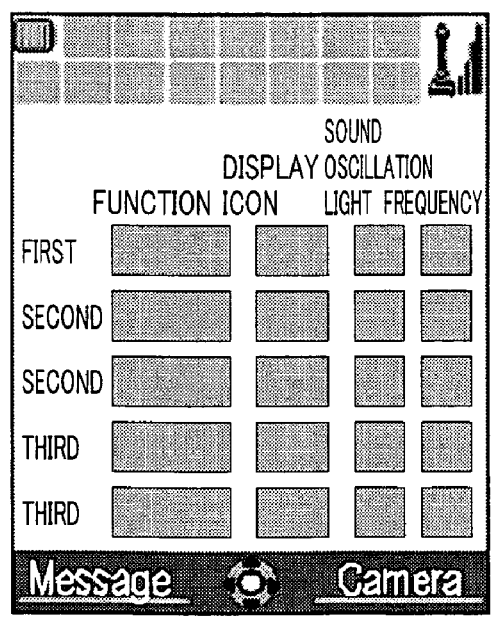

With reference to FIG. 24A and FIG. 24B, a priority setting image plane of portable phone 100 according to the present embodiment will be described. FIG. 24A is a view illustrating an aspect of the priority setting image plane based on a user's setting. FIG. 24B is a view illustrating an image plane for setting the priorities based on, for example, the utilization frequency and the recent selection record.

As illustrated in FIG. 24A, when the priority setting image plane is displayed, the image plane displays function setting entries, icon identification data inputting boxes and setting entries for output state (for example, the output of sound, oscillation, light emission or the like) associated with the functions. When the user fills in the respective entries, notification when the respective icons are selected is performed based on the setting when the user's setting is valid.

On the other hand, as illustrated in FIG. 24B, when the priorities are set based on the utilization frequency and the recent selection record, function inputting entries, icon identification data inputting entries, inputting entries for setting sound, oscillation or light and frequency inputting entries are displayed. When the user inputs particular data in the displayed entries, the priority setting based on the utilization frequency and the recent selection record can be made valid.

Figure 25:
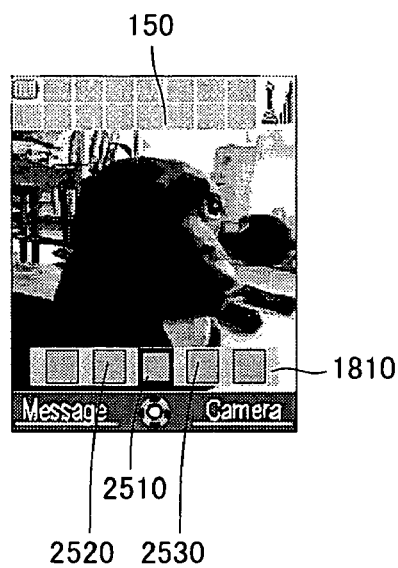

With reference to FIG. 25, an aspect of the display on main display 150 of portable phone 100 according to the present embodiment will be described. FIG. 25 is a view illustrating an aspect of the display of icon bar 1810 when an incoming call is received in the picture photographing mode of portable phone 100.

As illustrated in FIG. 25, when portable phone 100 is in the picture photographing mode, an image of an object photographed by main camera 140 or sub camera 142 is displayed in almost all of the image display area of main display 150. At this time, function icons associated with the picture photographing mode are usually displayed in icon bar 1810. When portable phone 100 receives a call at this state, predetermined icons such as icons having high priorities are preferentially displayed while the picture photographing mode is maintained. Therefore, an icon 2510 associated with the interrupt event (namely, incoming-call reception) can be displayed without terminating the currently-executed application (for example, displaying an image of an object).

Namely, for example, when an icon having a high priority is displayed at the center of icon bar 1810, icon 2510 for giving a notice of incoming-call reception in response to the reception is displayed at the center portion of icon bar 1810. At this time, icons 2520, 2530 required for photographing and the other icons, which have been displayed from the beginning of the picture photographing mode, are displayed at the portions other than the center portion. This enables the user to quickly respond to the interrupt event (for example, response to a call) while minimizing the amount of operation of up/down moving key 121 on main operation unit 120.

As previously described, with portable phone 100 according to the present embodiment, a plurality of icons can be displayed on the image display area of main display 150 or sub display 160 based on a user's setting or a predetermined calculation criteria. At this time, when the setting of priority display is valid, the respective icons are preferentially displayed, for example, based on the execution frequency or recent utilization record of the processes associated therewith. Therefore, function icons are sequentially displayed according to the user's utilization frequency. Thus, the user can rapidly perform desired functions without displaying a menu of processes by switching the image plane on main display 150. This may improve the usability of portable phone 100.

Further, in the event that other interrupt events (for example, reception of a call or mail) occur when icon bar 1810 including icons is displayed, icons associated with the function relating to the interrupt event are preferentially displayed. Therefore, the user can perform functions associated with the interrupt event without interrupting the execution of applications (for example, display of a photographed image, editing of documents, etc.).

Also, the user can switch ON/OFF of the display of icon bar 1810 by operating a particular key on main operation unit 120 or sub operation unit 130. Therefore, the user can turn off the display of icon bar 1810 in the case where the display of icon bar 1810 is unnecessary, and can display icon bar 1810 in the case where it is necessary. This enables efficiently displaying an image in the image display area of main display 150 or sub display 160, thereby enabling the user to efficiently operate it according to applications.

Further, the user can select and perform functions by operating a predetermined operation key, for example, the cursor moving key, the up/down key, etc., for icons which are preferentially displayed. This enables operation through sub operation unit 130 consisting of limited operation keys without using main operation unit 120 in the case where portable phone 100 is a foldable-type one including more than one cabinet or an openable-type portable phone and thus main operation unit 120 is retracted.

Figure 26:
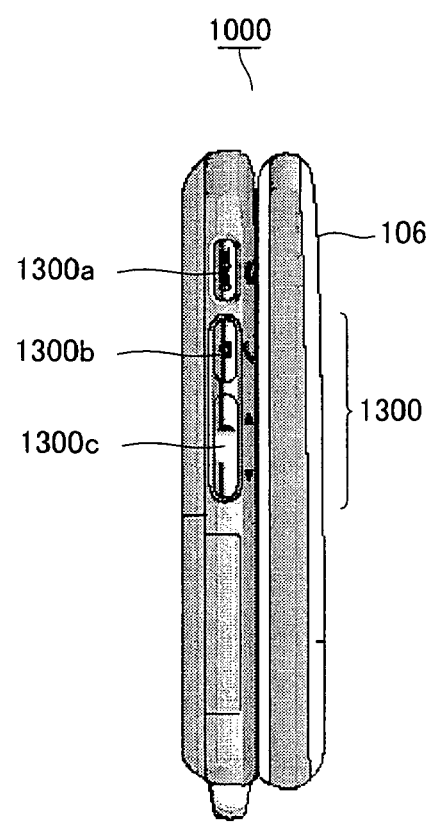
FIG. 26 is a view illustrating a structure of the portable phone according to an embodiment of the present invention.

Here, with reference to FIG. 26, an aspect of a different placement of sub operation unit 130 of portable phone 100 according to the present embodiment will be described. FIG. 26 is a view schematically illustrating an aspect of placing a sub operation unit 1300 at a side surface of a portable phone 1000.

As illustrated in FIG. 26, by placing at least three operation keys 1300a, 1300b and 1300c at a side surface of the cabinet, the user can switch the state of the display of icons displayed on the display device (not shown) of portable phone 1000 and can also select a particular icon. Therefore, it is not required to open portable phone 1000 to operate the main operation unit (not shown) for selecting icons, which may improve the usability.

Further, while image data of icons associated with respective functions is image data which is prestored in flash memory 140, data ROM 148 or memory card 182, image data is not limited thereto. For example, icons may be generated from static images photographed by main camera 140 or sub camera 142, image data received through data communication IF 178 and image data attached to received mails.

While particular icons are selected using cursor moving key 122 of main operation unit 120 in selecting icons to be displayed on main display 150 or sub display 160, the aspect of selection of icons is not limited to this. For example, as illustrated in FIG. 1, portable phone 100 includes a total of twelve 12-keys consisting of three keys in the right/left direction and four keys in the up/down direction. Therefore, three function icons may be displayed in the lateral direction and four function icons may be displayed in the vertical direction on main display 150, and further the respective 12-keys 124 may be associated with the display positions of the function icons. Thus, by detecting any of 12-keys 124 being pushed, instead of operation of cursor moving key 122, the selection of the icon can be detected. This clarifies relation between the displayed icons and 12-keys 124, thereby preventing the user from selecting wrong functions.

Further, the portable communication terminal is not limited to portable phone 100 illustrated in FIG. 1 and FIG. 2 and may be other terminals. Namely, while portable phone 100 illustrated in FIG. 1 and FIG. 2 has a shape which can be held in one hand of the user, it is not limited to this aspect and may be a terminal which can not be held in one hand.

Specifically, a portable communication terminal according to another aspect of the present invention includes a display unit having an image display area, a storing unit for storing image plane data for displaying image planes to be displayed in the image display area, a plurality of image data associated with a plurality of functions of the portable communication terminal, a plurality of display positions at which images based on the image data are to be displayed along a predetermined direction in the image display area, the priorities of respective the display positions, and the priorities of respective the functions, a detecting unit for detecting switching instructions for switching the display of the image planes, a generating unit for generating, in response to the switching instruction being detected, display data for displaying respective the images by associating the image data with the priorities of respective the display positions based on the priorities of respective the functions; and an input unit for receiving inputs of instructions from a user.

With the portable communication terminal having the aforementioned structure, the display unit can display images based on image data associated with functions at predetermined positions, based on the priorities. The user can easily select functions, thereby improving the operability.

Preferably, the storing unit includes criterion position data associated with predetermined positions in the image display area corresponding to respective the display positions. The portable communication terminal further includes a searching unit for searching image data associated with the criterion position data based on the respective priorities. The generating unit generates the display data by associating the searched image data with the criterion position data.

With the portable communication terminal having the aforementioned on, images are displayed in order at predetermined positions based on the respective priorities. Therefore, the user can easily select required images. Thus, a portable communication terminal capable of improving the operability for the user can be provided.

Preferably, the predetermined positions are display positions placed at the center in the row direction of the image display area. The criterion position data is data associated with the display area. The input unit includes an instruction input unit for receiving inputs of instructions for the selection in the row direction.

With the portable communication terminal having the aforementioned configuration, images are aligned and displayed in the row direction. The user can easily select images associated with functions required to be executed in the portable communication terminal.

Preferably, the predetermined positions are display positions placed at the center in the column direction of the image display area. The criterion position data is data associated with the display area. The input unit includes an instruction input unit for receiving an input of an instruction for the selection in the column direction.

With the portable communication terminal having the aforementioned structure, images are aligned and displayed in the column direction. The user can easily select images associated with functions required to be executed in the portable communication terminal.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A portable communication terminal comprising:
a storing unit storing image plane data for displaying image planes and a plurality of image data associated with a plurality of functions of said portable communication terminal;
a first display unit displaying images based on data stored in said storing unit;
a second display unit displaying images based on data stored in said storing unit;

a determining unit determining whether or not images based on said image data are to be displayed;

a generating unit generating display data for displaying said images based on the result of said determining unit, said generating unit includes a first generating unit generating said display data according to the image display area of said first display unit when said determining unit determines that images based on said image data are to be displayed on said first display unit, and said generating unit includes a second generating unit generating said display data according to the image display area of said second display unit when said determining unit determines that images based on said image data are to be displayed on said second display unit;

a control unit displaying, on either the first display unit or the second display unit, in a predetermined location of the first display unit or the second display unit, a first image associated with a function of a first priority based on the result of said determining unit, the control unit displaying adjacent to the first image, a second image associated with a function of a second priority, the second image is located on one side of the first image, and the control unit displaying adjacent to the first image, a third image associated with a function of the second priority, the third image is located on another side of the first image and the second priority is a lower priority than the first priority;

an input unit receiving an input of a selection instruction for said images;

the control unit executing the function associated with the image data of selected said image, and based on a detection of an interruption to the portable communication terminal, causing one of said first or second display unit to display an image associated with the interruption; and the control unit displaying said image associated with the interruption in the predetermined location of the first display unit or the second display unit, and displaying the first image associated with the function of the first priority in a position adjacent to the predetermined location of the first display unit or the second display unit.

2. The portable communication terminal according to claim 1, further comprising:

a first cabinet and a second cabinet which is foldable with respect to said first cabinet, wherein said input unit includes a first input unit for receiving an input of said selection instruction for images displayed on said first display unit; and a second input unit for receiving an input of said selection instruction for images displayed on said second display unit, wherein said second display unit is placed on the outer side of said portable communication terminal when said first cabinet and said second cabinet are folded and said first display unit is placed on a different surface from the surface on which said second display unit is placed.

3. The portable communication terminal according to claim 1, further comprising an information input unit for receiving an input of information from the outside, wherein said determining unit includes a display determining unit for determining whether or not the images based on said image data are to be displayed based on said information from the outside.

4. The portable communication terminal according to claim 3, wherein said information input unit includes a receiving unit for receiving information through a communication line, said portable communication terminal further comprises an identifying unit for identifying functions associated with said information based on said received information, wherein said storing unit further stores setting information designating whether or not the images based on the image data associated with said functions are to be displayed, and said display determining unit determines whether or not the images based on said image data are to be displayed based on the setting information associated with said identified functions.

5. The portable communication terminal according to claim 3, wherein said information input unit includes an operating unit for enabling a user to input instructions and said display determining unit determines whether or not the images based on said image data are to be displayed based on said instructions.

6. The portable communication terminal according to claim 3, wherein said information input unit includes an operation unit for receiving an input of instructions, said storing unit stores a plurality of position data for said images in said image display area, said display determining unit determines whether or not images are to be displayed at positions associated with any of said plurality of position data based on said instructions, and said generating unit generates said display data according to position data of positions different from said positions associated with any of said position data, when it is determined that said images are not to be displayed at said positions associated with any of said position data.

7. The portable communication terminal according to claim 1, wherein the function of the first priority is a function that has been most recently used.

8. The portable communication terminal according to claim 1, wherein the control unit displaying adjacent to the second image or the third image, a fourth image associated with a function of a third priority; and the control unit displaying adjacent to the second image or the third image, a fifth image associated with a function of the third priority and the third priority is a lower priority than the second priority.

9. A portable communication terminal comprising:

a storing unit storing image plane data for displaying image planes and a plurality of image data associated with a plurality of functions of said portable communication terminal;

a display unit displaying images based on data stored in said storing unit;

a determining unit determining whether or not images based on said image data are to be displayed;

a generating unit generating display data for displaying said images based on the result of said determining unit, wherein said generating unit generating said display data according to the image display area of said display unit when said determining unit determines that images based on said image data are to be displayed on said display unit;

a control unit displaying in a predetermined location of the display unit, an image associated with a function of a first priority, the control unit displaying adjacent to the predetermined location, a second image associated with a function of a second priority, the second image is located on one side of the first image, and the control unit displaying adjacent to the predetermined location, a third image associated with a function of the second priority, the third image is located on another side of the first image and the second priority is a lower priority than the first priority;

an input unit receiving an input of a selection instruction for said images;

the control unit executing the function associated with the image data of selected said image, and based on a detection of an interruption to the portable communication terminal, causing said display unit to display an image associated with the interruption; and the control unit displaying said image associated with the interruption in the predetermined location of the display unit, and displaying the image associated with the function of the first priority in a position adjacent to the predetermined location of the display unit.

10. The portable communication terminal according to claim 9, wherein the control unit displaying adjacent to the second image or the third image, a fourth image associated with a function of a third priority; and the control unit displaying adjacent to the second image or the third image, a fifth image associated with a function of the third priority and the third priority is a lower priority than the second priority.

11. A displaying method comprising:

storing image plane data for displaying image planes and a plurality of image data associated with a plurality of functions;

displaying images based on data stored;

determining whether or not images based on said image data are to be displayed;

generating display data for displaying said images based on the result of said determining, wherein generating said display data according to the image display area when said determining determines that images based on said image data are to be displayed;

displaying in a predetermined location, an image associated with a function of a first priority;

displaying adjacent to the predetermined location, a second image associated with a function of a second priority, the second image is located on one side of the first image;

displaying adjacent to the predetermined location, a third image associated with a function of the second priority, the third image is located on another side of the first image and the second priority is a lower priority than the first priority;

receiving an input of a selection instruction for said images;

executing the function associated with the image data of selected said image;

detecting an interruption to a portable communication terminal;

displaying an image associated with the interruption in the predetermined location; and displaying the image associated with the function of the first priority in a position adjacent to the predetermined location.

12. The displaying method according to claim 11, further comprising:

displaying adjacent to the second image or the third image, a fourth image associated with a function of a third priority; and displaying adjacent to the second image or the third image, a fifth image associated with a function of the third priority and the third priority is a lower priority than the second priority.

13. A computer-readable medium having instructions stored thereon, such that when the instructions are read and executed by a processor, the processor is configured to perform the steps of:

storing image plane data for displaying image planes and a plurality of image data associated with a plurality of functions;

displaying images based on data stored;

determining whether or not images based on said image data are to be displayed;

generating display data for displaying said images based on the result of said determining, wherein generating said display data according to the image display area when said determining determines that images based on said image data are to be displayed;

displaying in a predetermined location, a first image associated with a function of a first priority;

displaying adjacent to the predetermined location, a second image associated with a function of a second priority, the second image is located on one side of the first image;

displaying adjacent to the predetermined location, a third image associated with a function of the second priority, the third image is located on another side of the first image and the second priority is a lower priority than the first priority;

receiving an input of a selection instruction for said images;

executing the function associated with the image data of selected said image;

detecting an interruption to a portable communication terminal;

displaying an image associated with the interruption in the predetermined location; and displaying the first image associated with the function of the first priority in a position adjacent to the predetermined location.

* * * * *